(12) United States Patent
Miyamoto et al.

(10) Patent No.: US 7,965,502 B2
(45) Date of Patent: Jun. 21, 2011

(54) STORAGE DEVICE

(75) Inventors: Kenichi Miyamoto, Odawara (JP); Chikazu Yokoi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/775,774

(22) Filed: May 7, 2010

(65) Prior Publication Data

US 2010/0220436 A1    Sep. 2, 2010

Related U.S. Application Data

(63) Continuation of application No. 12/007,592, filed on Jan. 14, 2008, now Pat. No. 7,719,834.

(30) Foreign Application Priority Data

Apr. 13, 2007 (JP) ................................. 2007-106273

(51) Int. Cl.
*G06F 1/20* (2006.01)
*H05K 7/20* (2006.01)

(52) U.S. Cl. ......... 361/679.48; 361/679.33; 361/679.37; 361/679.39; 361/695; 312/236; 454/184

(58) Field of Classification Search ............. 361/679.02, 361/679.31–679.33, 679.37, 679.39, 679.46, 361/679.48, 690, 692, 694–695, 715–716; 165/80.3; 312/236; 454/184

See application file for complete search history.

(56) References Cited

U.S. PATENT DOCUMENTS

| 5,777,845 | A | 7/1998 | Krum et al. |
| 6,351,375 | B1 | 2/2002 | Hsieh et al. |
| 6,724,623 | B2 | 4/2004 | Bovio et al. |
| 6,816,368 | B2 | 11/2004 | Yokosawa |
| 6,856,508 | B2 | 2/2005 | Rabinovitz |
| 6,931,306 | B2 | 8/2005 | Frankel et al. |
| 7,027,298 | B2 | 4/2006 | Wu et al. |
| 7,046,470 | B2 | 5/2006 | Yamanashi et al. |
| 7,139,170 | B2 | 11/2006 | Chikusa et al. |
| 7,150,635 | B2 | 12/2006 | Ostmoe et al. |
| 7,251,132 | B1 | 7/2007 | Paul et al. |
| 7,352,571 | B2 | 4/2008 | Suzuki et al. |
| 7,359,186 | B2 | 4/2008 | Honda et al. |
| 7,375,960 | B2 | 5/2008 | Blaalid et al. |
| 7,465,189 | B2 | 12/2008 | Marcade et al. |
| 7,609,477 | B2 | 10/2009 | Atarashi et al. |
| 7,643,281 | B2 * | 1/2010 | Okamoto et al. ........ 361/679.33 |
| 7,715,188 | B2 * | 5/2010 | Matsushima et al. .... 361/679.51 |

(Continued)

FOREIGN PATENT DOCUMENTS

JP    2000-149542 A    5/2000

(Continued)

*Primary Examiner* — Robert J Hoffberg
(74) *Attorney, Agent, or Firm* — Volpe and Koenig, P.C.

(57) ABSTRACT

A storage device includes an enclosure, a plurality of drive connectors within the enclosure to which media drives are connected, a cooling fan in the enclosure, a backboard positioned to divide an interior space of the enclosure in an antero-posterior direction, and a plurality of temperature-dependent devices disposed behind the backboard. Air is taken in via an enclosure front face from outside the enclosure due to the cooling fan's rotation, flows through the interior space of the enclosure, and passes through the backboard. The backboard has all or some of the drive connectors on a front face thereof, arranged in a matrix configuration having a plurality of rows and a plurality of columns. The plurality of drive connectors includes two first drive connectors, each first drive connector connected to a user-detachable media drive and located in a same column of the matrix configuration.

9 Claims, 31 Drawing Sheets

U.S. PATENT DOCUMENTS

| | | |
|---|---|---|
| 2003/0112598 A1 | 6/2003 | Yokosawa et al. |
| 2003/0222618 A1 | 12/2003 | Kanouda et al. |
| 2005/0114876 A1 | 5/2005 | Atarashi et al. |
| 2007/0025076 A1 * | 2/2007 | Matsushima et al. ......... 361/687 |
| 2007/0293085 A1 | 12/2007 | Marcade et al. |
| 2008/0148303 A1 * | 6/2008 | Okamoto et al. ............. 720/652 |

FOREIGN PATENT DOCUMENTS

| | | |
|---|---|---|
| JP | 2005158101 | 6/2005 |
| JP | 2006-073045 A | 3/2006 |

* cited by examiner

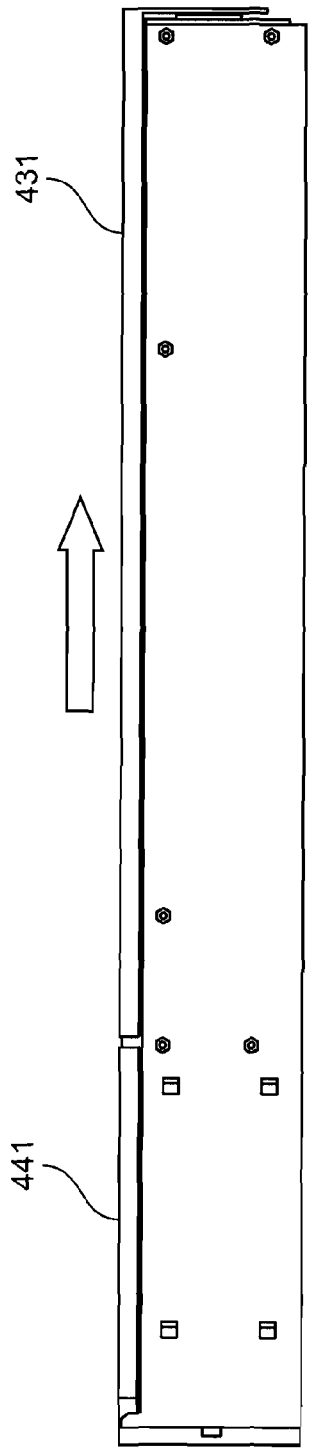
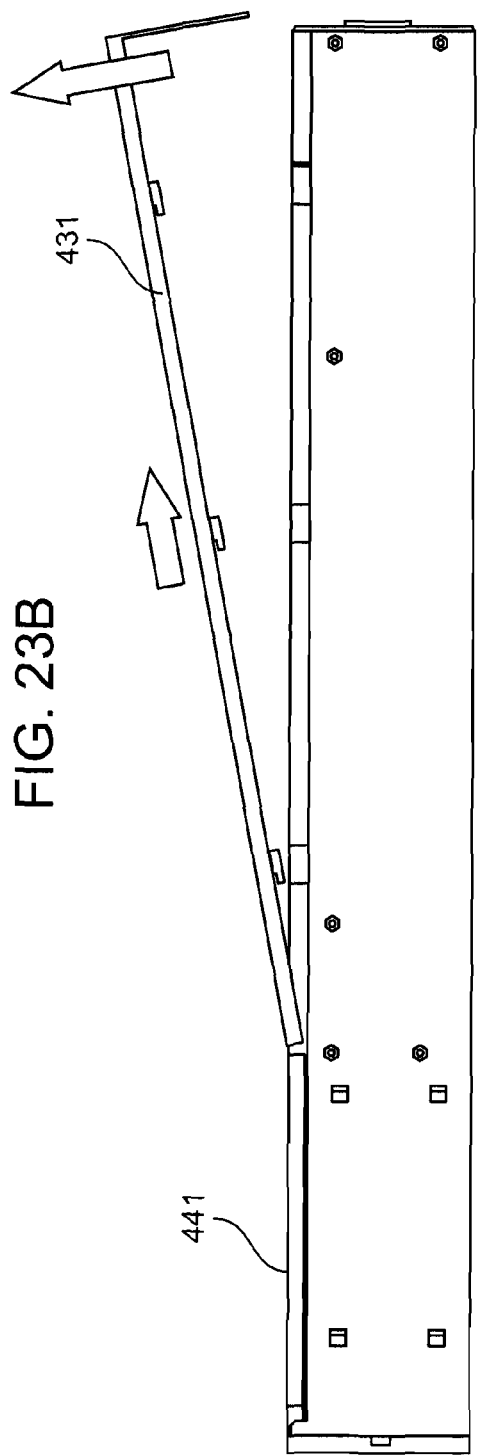
FIG. 23A
FIG. 23B

FIG. 25A

| TEMPERATURE (°C) | SPEED (REVOLUTIONS/MINUTE) |
|---|---|
| LESS THAN 25 | 4000 |
| NOT LESS THAN 25 AND LESS THAN 32 | 6000 |
| 32 OR MORE | 8000 |

| TEMPERATURE (°C) | SPEED (REVOLUTIONS/MINUTE) |
|---|---|
| LESS THAN 45 | 4000 |
| NOT LESS THAN 45 AND LESS THAN 55 | 6000 |
| 55 OR MORE | 8000 |

~453B

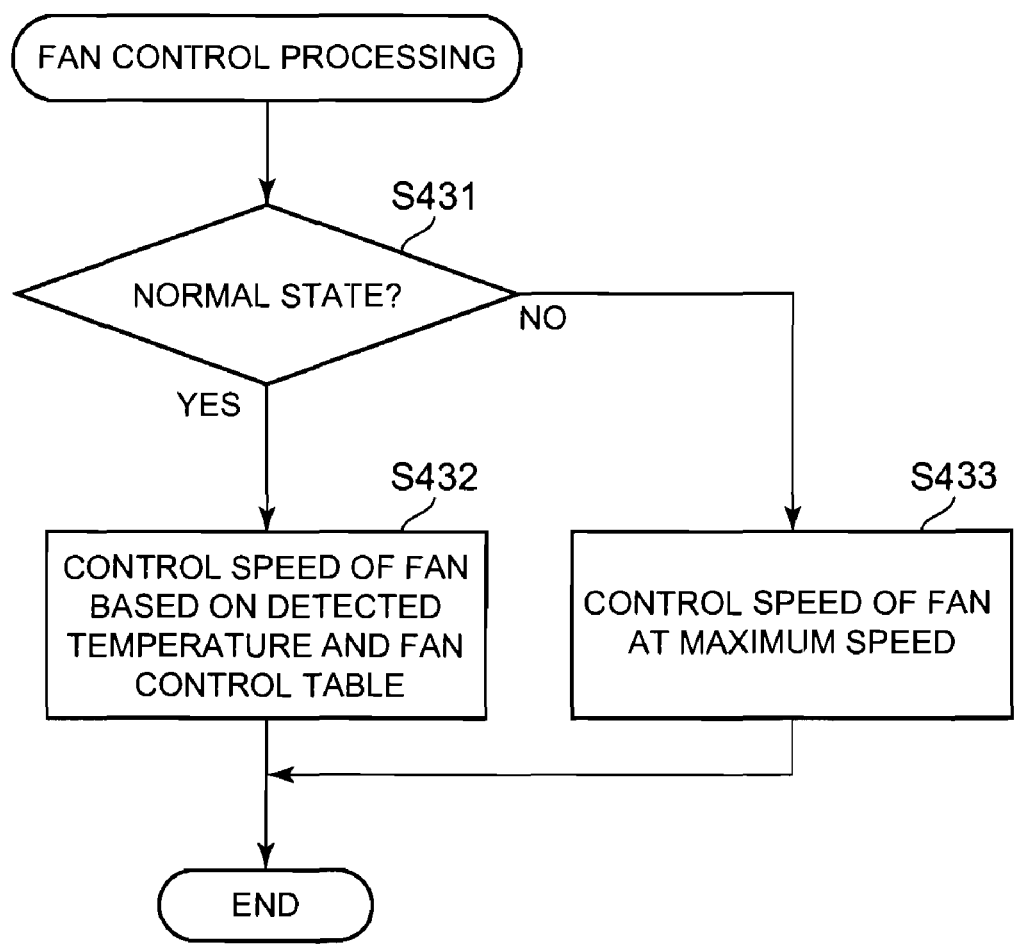

FIG. 27

| SITE OF FAULT | SPEED (REVOLUTIONS/MINUTE) | ~455 |
|---|---|---|
| . . . . | . . . . | |
| . . . . | . . . . | |
| ⋮ | ⋮ | |

STORAGE DEVICE

CROSS-REFERENCE TO PRIOR APPLICATION

This application is a continuation of U.S. application Ser. No. 12/007,592, filed Jan. 14, 2008, which claims the benefit of priority from Japanese Patent Application number 2007-106273, filed on Apr. 13, 2007, the entire disclosure of which is incorporated herein by reference.

BACKGROUND

The present invention generally relates to a storage device.

The mounting of respective media drives in a canister and the installation of respective canisters in the storage device is known (Japanese Application Laid Open No. 2005-158101, for example). A canister is a device provided with a media drive (a hard disk drive, for example) and a handle and so forth.

In maintenance work, the media drive in the canister can be removed from the storage device by pulling out the canister by grasping the handle thereof. In order to perform maintenance work, a certain degree of knowledge with regard to the constitution of the storage device and the method of using same and so forth is generally required. However, users that use the storage device are not necessarily limited to such knowledge. Hence, an improvement in user convenience is desirable.

SUMMARY

Therefore, an object of the present invention is to provide a storage device of favorable user convenience.

Further objects of the present invention will become evident from the following description.

Two or more media drives are pre-installed in an enclosure in such a way that removal by the user is impossible. An expansion slot member with expansion drive slots in a smaller number than the number of media drives that can be pre-installed is provided. The media drives that are installed via the expansion drive slots can be removed by the user.

BRIEF DESCRIPTION OF THE DRAWINGS

FIG. 23A shows the sliding of the second enclosure cover to the rear of the enclosure;

FIG. 23B shows the removal of the second enclosure cover from the enclosure 2 by lifting and pulling rearward the rearward part of the second enclosure cover that has been made to slide;

FIG. 25A shows an example of a first fan control table;

FIG. 25B shows an example of a second fan control table;

FIG. 26 shows the flow of fan control processing;

FIG. 27 shows an example of a third fan control table;

DETAILED DESCRIPTION OF THE PREFERRED EMBODIMENTS

Figure 1:
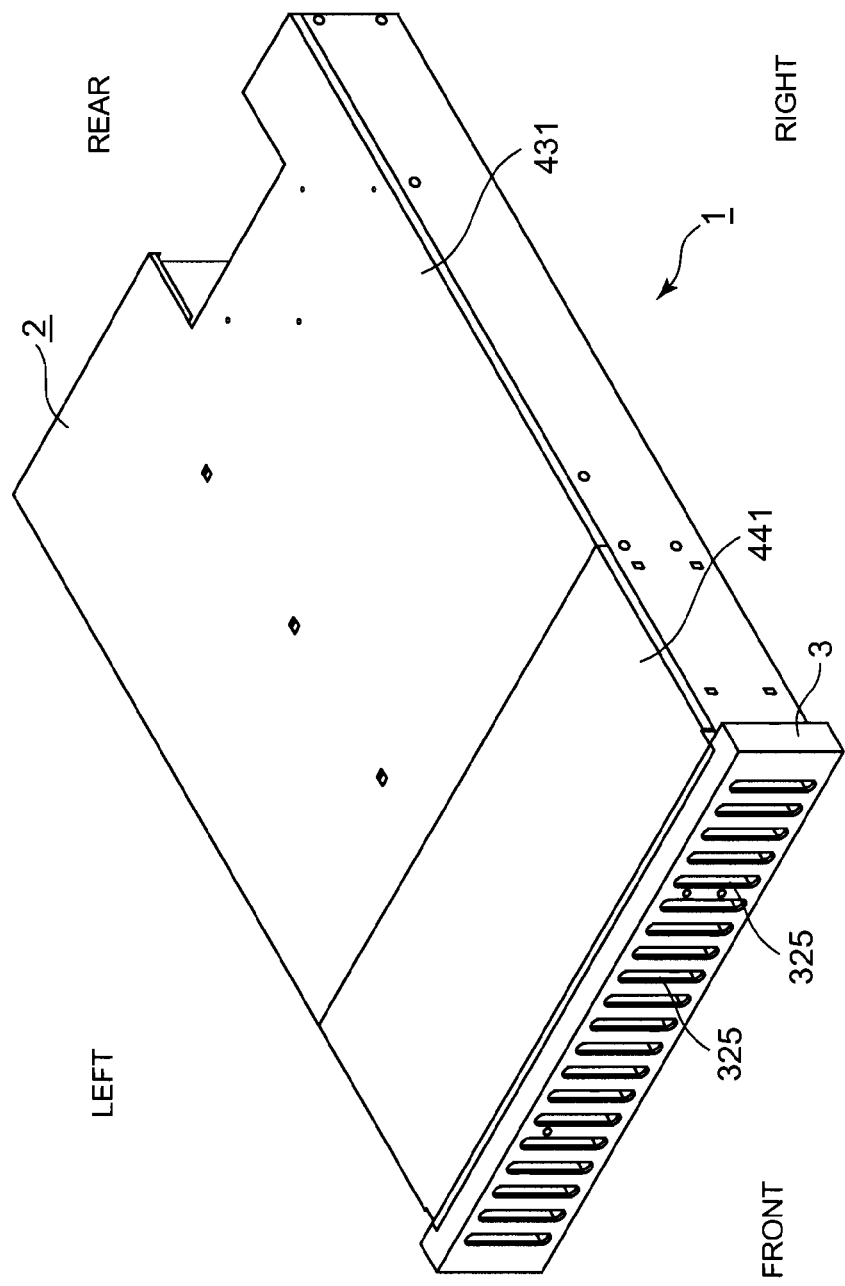
FIG. 1 is a perspective view that provides an outside view from the front face of the storage device according to an embodiment of the present invention.

One point in common to the following plurality of embodiments is that the storage device comprises a plurality of media drives in the enclosure.

In one embodiment, two or more media drives are connected beforehand to two or more drive connectors among a plurality of drive connectors provided in the enclosure and these two or more media drives are undetachable. An expansion slot member that has a smaller number of expansion drive slots than the number of media drives that can be pre-installed (the lowest number of pre-installed media drives, for example) is provided in the enclosure. The plurality of drive connectors is a set of a first drive connector to which a media drive (sometimes called 'expansion drive' hereinbelow) inserted via an expansion drive slot is connected and a second drive connector to which a pre-installed media drive is connected. The expansion drive connected to the first drive connector is installed so as to be detachable by the user.

Media drives are the drives of storage media and hard disks, DVD (Digital Versatile Disks), CD (Compact Disk), opto-magnetic drives, or semiconductor memory (flash memory, for example) can be adopted as the storage media.

In one embodiment, a cooling fan, backboard, and a plurality of temperature-dependant devices are provided in the enclosure. The backboard is a circuit substrate at whose front face all or some of the plurality of drive connectors are provided and which is disposed such that the enclosure space is divided. The plurality of temperature-dependent devices are disposed at the rear of the backboard (back face of the backboard). Air is taken in via the front face of the enclosure from outside the enclosure as a result of the rotation of the cooling fan and flows in the enclosure and the air passes through the backboard. A media drive is connected beforehand to a second drive connector other than a certain drive connector on the backboard.

In one embodiment, the front face of the backboard has a matrix that is constituted by a first drive connector and a second drive connector. The respective rows that constitute the matrix are parallel to the width direction of the enclosure and the respective columns constituting the matrix are parallel to the height direction of the enclosure. The certain drive connector is a drive connector in a position that is determined on the basis of predetermined rules. The predetermined rules are at least one of the following rules (1) to (5).

(Rule 1): media drives are connected in order of priority to a second drive connector located in front of a device of low temperature dependence;

(Rule 2): drive connectors to which media drives are not connected are not successive in each column of the matrix;

(Rule 3): The first drive connector is in a column on the edge of the matrix;

(Rule 4): Media drives are connected in order of priority to the drive connectors that constitute at least one column of a plurality of columns located in front of the controller in the matrix;

(Rule 5): Media drives are connected in order of priority to a drive connector in a low position.

In one embodiment, the plurality of temperature-dependent devices include a battery and a power device. A media drive is not connected to a drive connector that is in front of the battery (upstream of the flow of the air, for example) and a media drive is connected to the drive connector in front of the power device.

In one embodiment, a media drive and controller are connected beforehand to the rear face of the backboard and a battery is provided in front of the power device and space that is produced between the media drive and controller.

In one embodiment, a battery is provided in front of the power device within the enclosure.

In one embodiment, the power device and power connector on the rear face of the backboard are connected by means of a cable.

In one embodiment, a battery control circuit substrate for controlling the discharge of the battery is provided in front of the battery in a position that is spaced apart from the battery. The battery control circuit substrate and the battery are connected by means of a cable.

In one embodiment, a switch control circuit substrate with a switch for turning ON the power of the power device is provided in a position in which the switch is exposed via the rear face. The battery control circuit substrate and the switch control circuit substrate are constituted having substantially the same size. The battery control circuit substrate is provided in the vicinity of the switch control circuit substrate (in substantially the same position, for example).

In one embodiment, a backboard which is a circuit substrate having a plurality of drive connectors is provided. Each of the plurality of drive connectors is a SAS (Serial Attached SCSI) drive connector. Two or more media drives that are undetachably pre-installed are constituted by SATA drives and each SATA drive (Serial ATA) drive is connected to the second drive connector via an interface conversion device. The interface conversion device is connected beforehand to the first drive connector.

In one embodiment, two or more media drives that are undetachably pre-installed are constituted by SAS drives. Each SAS drive is connected directly to a second drive connector without the involvement of an interface conversion device that is interposed between the SATA drive and SAS drive connector in order to connect the SATA drive to the SAS drive connector. The storage device is shipped without the interface conversion device being attached as an accessory.

In one embodiment, two or more media drives that are undetachably pre-installed are constituted by SATA drives. Each SATA drive is connected to a second drive connector via an interface conversion device. Each of the one or more first drive connectors is provided with a protrusion that enters a cutout that is absent from the connector of a SATA drive but which exists in the connector of a SAS drive in cases where the SAS drive is connected.

In one embodiment, two or more media drives that are undetachably pre-installed are constituted by SATA drives. Each SATA drive is connected to a second drive connector via an interface conversion device. The storage device is provided with a sensing section for sensing the fact that a SATA drive has been erroneously connected to the first drive connector and a reporting section that reports the fact a SATA drive has been erroneously connected. The sensing section and the reporting section may each be hardware, a computer program, or a combination thereof (where part is formed by hardware and the rest is a computer program).

In one embodiment, when two or more media drives that are undetachably pre-installed are constituted by SATA drives, each SATA drive is connected to a second drive connector via an interface conversion device. A hole (which need not be a through-hole, for example) is made in the vicinity of the first drive connector of the backboard (in an area of the backboard opposite the interface conversion device in cases where the interface conversion device is connected to the first drive connector, for example). The interface conversion device is attached as an accessory and a protrusion is provided in the surface of the interface conversion device opposite the backboard. In cases where the interface conversion device is connected to the first drive connector, the protrusion provided in a position facing the hole in the backboard enters the hole. The interface that is attached as an accessory is a device that is attached to a SATA drive that is inserted in the expansion drive slot.

In one embodiment, in cases where the two or more media drives that are undetachably pre-installed are constituted by SAS drives, the hole in the backboard is covered beforehand.

In one embodiment, a first front bezel is undetachably attached to the front face of the enclosure. The first front bezel covers the front faces of the pre-installed media drives and the surface of the first front bezel is constituted by an insulator.

In one embodiment, the expansion slot member has a door that opens and closes the expansion drive slot.

In one embodiment, the door is two doors that are spaced vertically in the height direction of the enclosure and the two doors are constituted to open in the direction of insertion of a media drive. The expansion drive slot is provided in a position spaced apart in a forward direction by a distance equal to or more than the widths of each of the two doors from the front face of the media drive connected via the slot.

In one embodiment, an insulating second front bezel is detachably attached to the doors; and the attached first front bezel is substantially flush with the attached second front bezel.

In one embodiment, a power cable connector that is provided on the rear face of the enclosure and a detachable enclosure cover that has a member that surrounds the power cable connector and which constitutes at least part of the upper surface of the enclosure are provided.

In one embodiment, the enclosure cover has an insertion section that is inserted in the member constituting a separate part of the upper surface of the enclosure and the length of the insertion section in the posterior direction is greater than the distance that the enclosure cover is able to move in the posterior direction.

In one embodiment, a partial area of the rear face of the enclosure sinks forward and a connector for a connection with the controller is provided at the maximum depth of the cavity. This connector makes it possible to connect a cable or a dedicated line for communicating via a communication network with a device outside the storage device, for example.

In one embodiment, each of the connected media drives is itself a media drive that is not attached to a canister.

In one embodiment, pushable sections that push the media drives are installed on the rear faces of the first and second front bezels.

In one embodiment, pushable sections are respective elastic members that are provided in respective positions facing the respective media drives.

In one embodiment, the distance from the rear faces of the first and second front bezels to the media drives that are connected to the drive connectors differs depending on whether the media drives are SAS drives or SATA drives. The pushable sections are constituted to push the SAS drives or SATA drives by means of a stronger force than the force that would cause the drives to fall out in a state where the first and second front bezels are attached irrespective of the distance from the rear faces of the first and second front bezels to the front faces of the respective media drives.

In one embodiment, rails for guiding the inserted media drives to the drive connectors are provided for each drive connector. The height of the passage along which the media drives pass on the rails is a height that corresponds with the height of the media drives.

In one embodiment, a first temperature sensor that detects the temperature of the processor or in the vicinity thereof; and a second temperature sensor that detects the temperature in the vicinity of an exhaust vent for air that is taken in by the cooling fan are provided. The controller controls the speed of the cooling fan on the basis of first temperature control information corresponding with the first temperature sensor and second temperature control information that corresponds with the second temperature sensor. The respective first and second temperature control information expresses the correspondence between the detected temperature range and speed.

Two or more embodiments among the above plurality of embodiments can be combined.

An embodiment of the present invention will be described hereinbelow in detail with reference to the drawings.

<Constitution and Functions of Storage Device>

Figure 2:
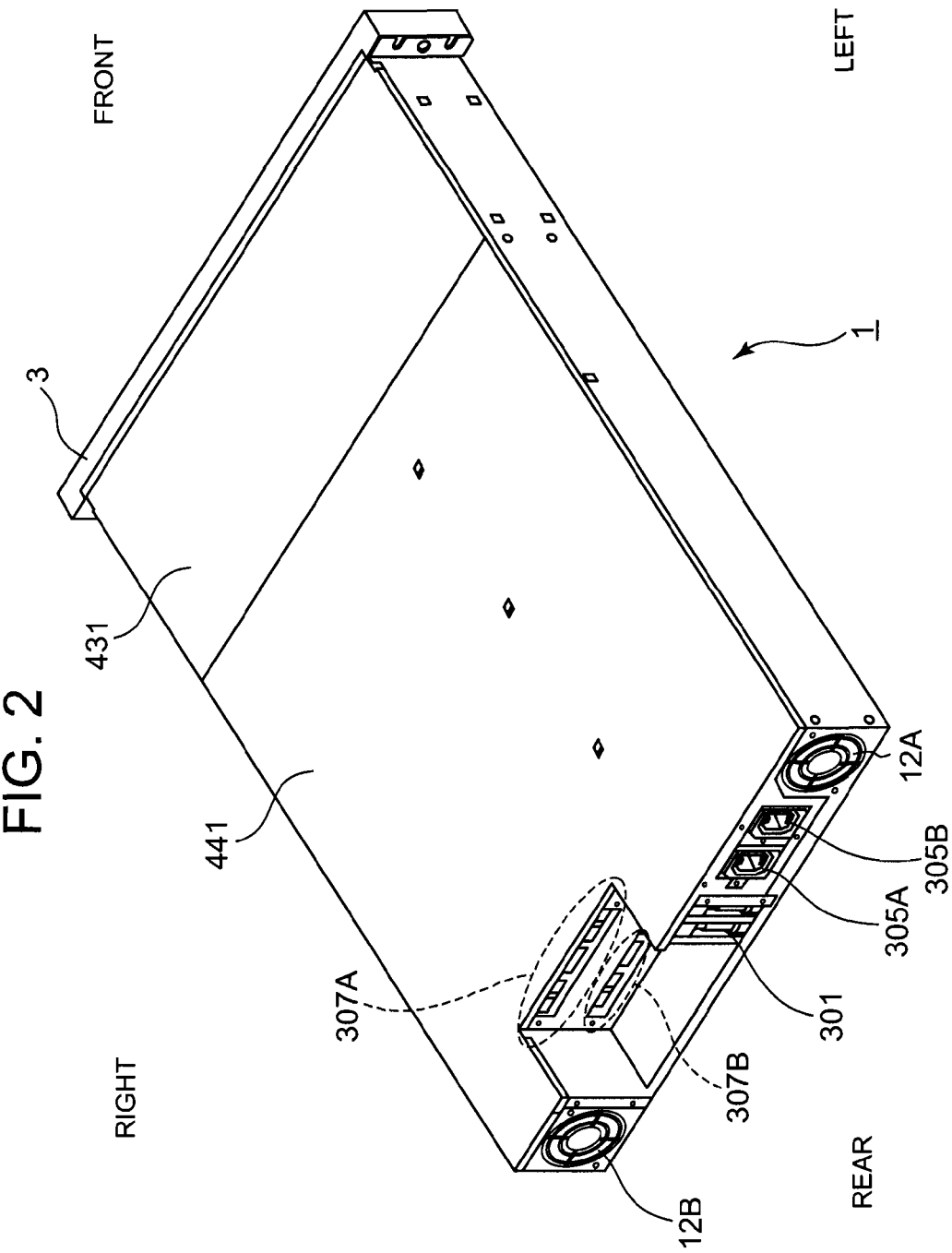
FIG. 2 is a perspective view that provides an outside view from the rear of the storage device.
Figure 3:
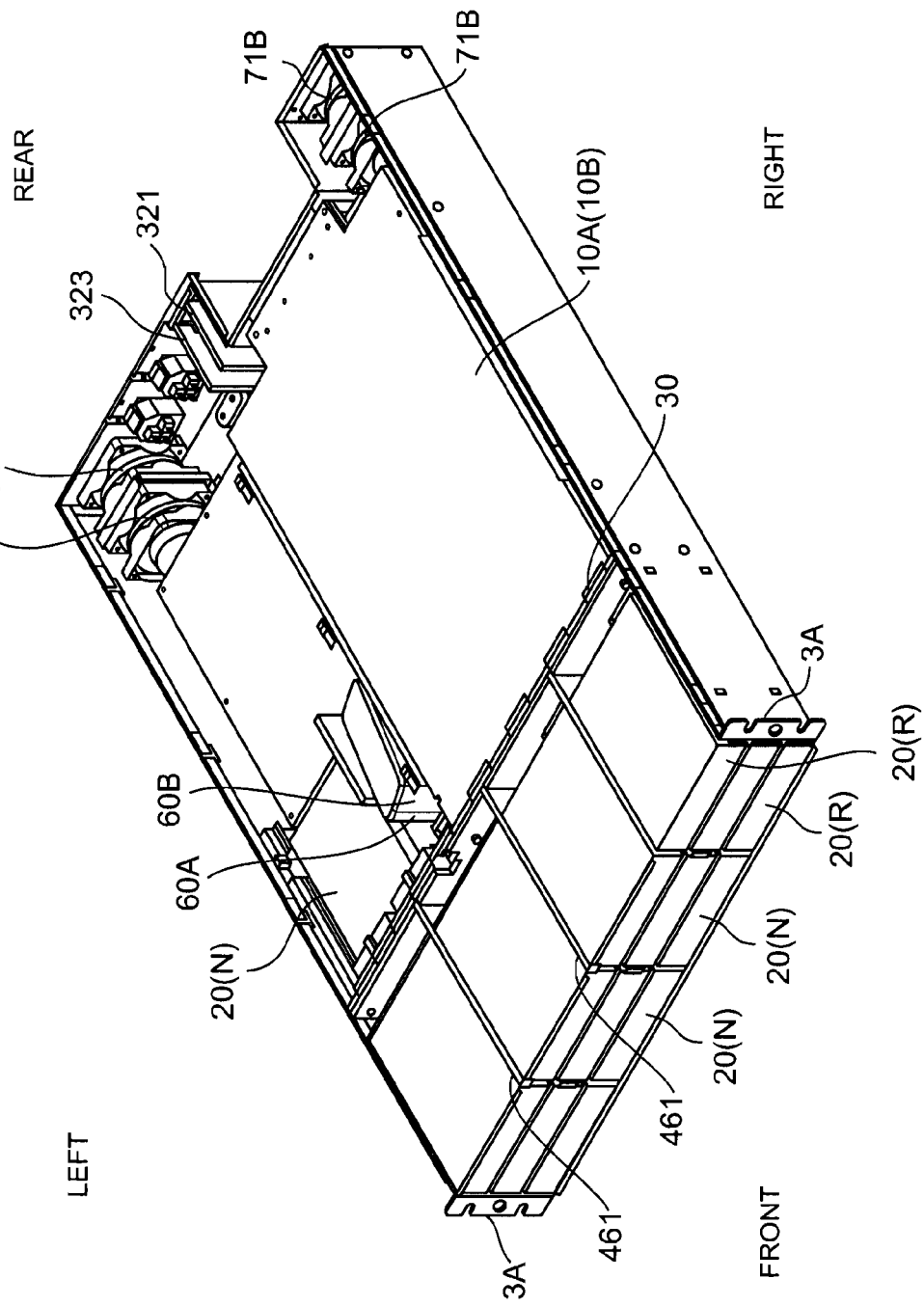
FIG. 3 is a perspective view that provides an outside view from the front of the interior of the enclosure of the storage device.
Figure 4:
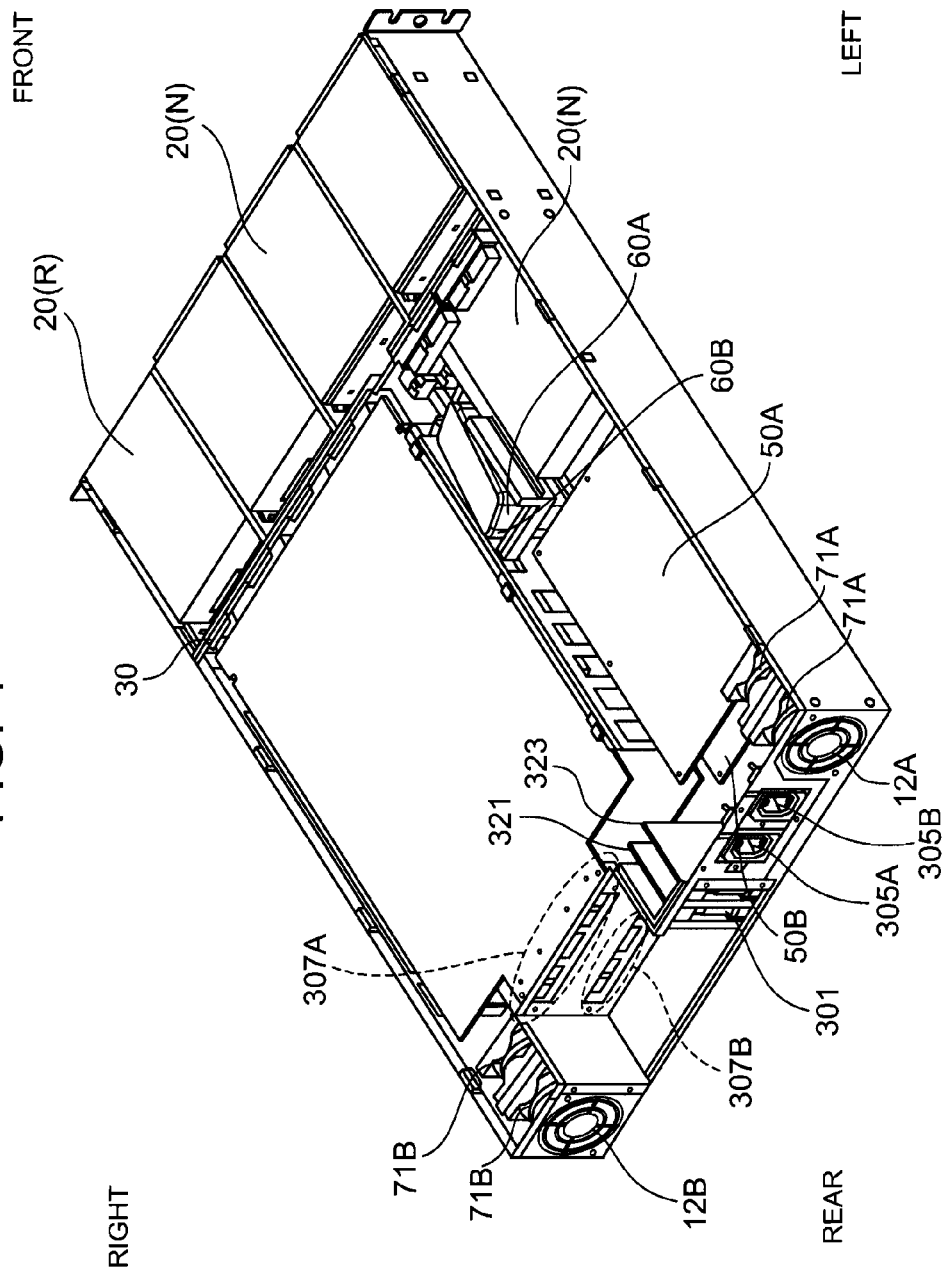
FIG. 4 is a perspective view that provides an outside view from the rear of the interior of the enclosure of the storage device.

FIG. 1 is a perspective view that provides an outside view from the front of the storage device according to one embodiment of the present invention. FIG. 2 is a perspective view that provides an outside view from the rear of the storage device. FIG. 3 is a perspective view that provides an outside view from the front of the interior of the enclosure of the storage device. FIG. 4 is a perspective view that provides an outside view from the rear of the interior of the enclosure of the storage device. FIGS. 3 and 4 represent cases where the maximum number of hard disk drives (HDD) including the repair HDD (described subsequently) are installed (fourteen HDD are installed, for example). As described subsequently, the maximum number of hard disk drives need not be installed. Furthermore, in the following description, in order to easily understand the positional relationship of each of the constituent elements, the first horizontal direction toward the front face of the enclosure is referred to as 'right' and the other horizontal direction to the front face of the enclosure is known as 'left' for the sake of convenience. The storage device may have a constitution that is bilaterally symmetric to the constitution shown in FIGS. 1 to 4.

The storage device 1 has an enclosure 2. Enclosure 2 is a substantially rectangular parallelepiped-shaped box, for example (a rectangular parallelepiped-shaped box which is longest in the depth direction, where the width is next-longest and the height is the shortest, for example). The height of the enclosure 2 is 2U, for example, the width of the enclosure 2 is substantially 450 mm, for example (on the order of 445 mm to 455 mm, for example), and the depth of the enclosure 2 is substantially 700 mm, for example (on the order of 695 mm to 705 mm, for example).

The front face of the enclosure 2 is free and the HDD 20 is inserted via the front face and housed within the enclosure 2. An attachment 3A is provided on both ends of the front face of the enclosure 2 (both ends in the width direction of the enclosure 2). An outside front bezel 3 that covers the whole of the front face of the enclosure 2 is attached to the attachment 3A with an inside front bezel 501 (described subsequently) (FIG. 18 shows the rear face of an example thereof) interposed therebetween. More specifically, a flange that extends laterally from both the left and right ends of the enclosure front face is provided as the attachment 3A, for example, and an outside front bezel 3 is attached to the flange. The outside front bezel 3 is provided with a plurality of through-holes (slits, for example) 325 to allow the air outside the enclosure 2 to flow into the enclosure 2. Likewise, a plurality of through-holes for allowing the air outside the enclosure 2 to flow into the enclosure 2 are provided in the inside front bezel 501.

A circuit substrate ('backboard' hereinbelow) 30 is provided in order to divide the space within the enclosure 2 into a front part and a rear part in the enclosure 2. HDD (a maximum of twelve HDD, for example) 20, which are connected to the front face of the backboard 30, exist in the intra-enclosure front part and main controllers 10A and 10B, power devices 50A and 50B, batteries 60A and 60B, cooling fans 71A and 71B, a switch subcontroller 321, and a battery subcontroller 323 which are connected to the rear face of the backboard 30 exist in the intra-enclosure rear part. The main controllers, power devices, batteries, and cooling fans are each multiplexed (duplexed, for example) and, as a result, the main controllers 10A and 10B, power devices 50A and 50B, batteries 60A and 60B and cooling fans 71A and 71B are created. The main controllers and power devices are each circuit substrates, for example. In FIG. 3, the main controller 10B is not visible, being hidden directly below the main controller 10A and therefore appears in this description as '10A (10B)'.

The upper surface of the enclosure 2 is constituted by a first enclosure cover 441 and a second enclosure cover 431. The first enclosure cover 441 covers the intra-enclosure front part (the HDD housed toward the front within the enclosure, for example) and is constituted such that same cannot be removed from the enclosure 2, for example (the first enclosure cover 441 is integrated with both side walls constituting both sides of the enclosure 2 respectively or welded to both side walls, for example). The second enclosure cover 431 covers the intra-enclosure front part and is constituted such that same cannot be removed from the enclosure 2. However, the second enclosure cover (top panel, for example) 431 is constituted such that same cannot be removed while an AC power cable remains inserted in the rear face of the enclosure 2 (the constitution will be described in detail subsequently).

The rear face of the enclosure 2 is provided with through-holes 12A and 12B, power cable connectors 305A and 305B and a main switch 301. The through-holes 12A and 12B are exhaust holes through which air flows within the enclosure as a result of the rotation of the cooling fans 71A and 71B. The power cable connectors 305A and 305B are each connected to the power devices 50A and 50B. The main switch 301 is a switch for turning the power of the power devices 50A and 50B ON and OFF.

A partial area of the rear face of the enclosure 2 sinks toward the front and a communication connector group (a group that is constituted by one or more LAN (Local Area Network) connectors and/or communication connectors of another type, for example) 307A and 307B are provided at the maximum depth of this recess. The communication connector groups 307A and 307B are connected directly (or via a cable) to the main controllers 10A and 10B respectively. The recess can be expected to have the effect of one type of countermeasure against static electricity. Further, the recess is behind the main controllers 10A and 10B and, therefore, the length of the main controllers 10A and 10B in the anteroposterior direction (the length in the depth direction) can be shortened further than the length of the intra-enclosure rear part in the anteroposterior direction.

Figure 8A:
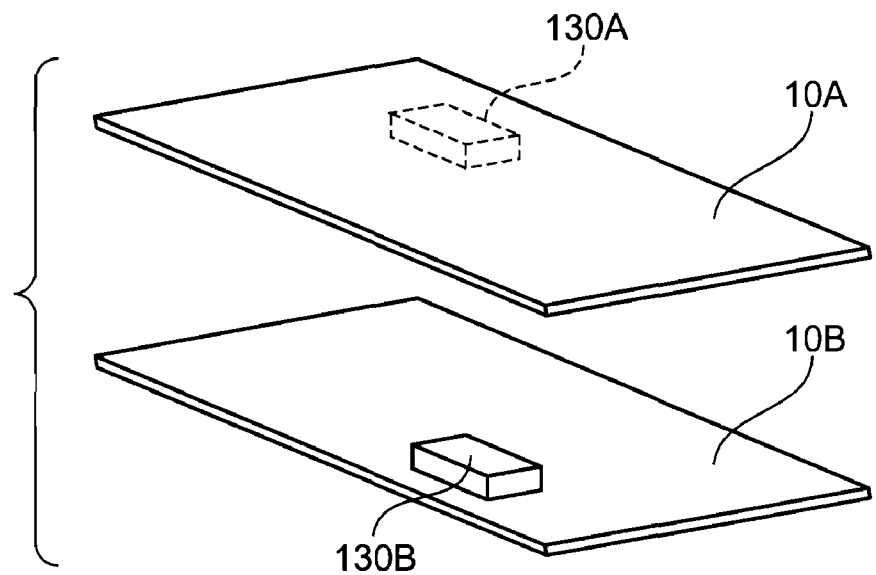
FIG. 8A is a perspective view of the disposition of a redundant main controller.
Figure 8B:
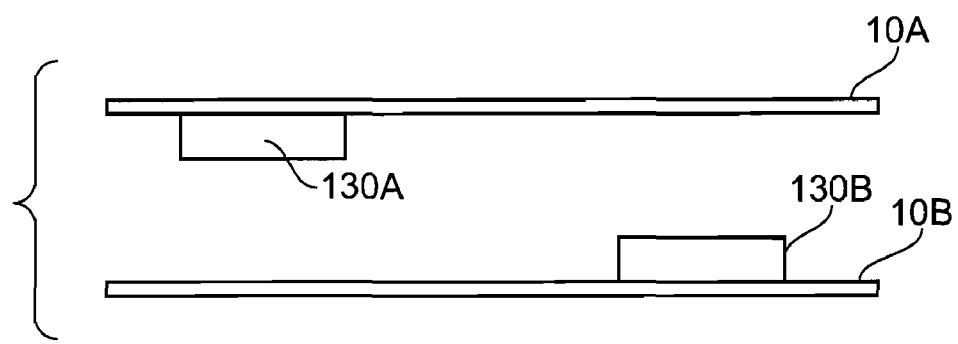
FIG. 8B is a front view of a redundant main controller.

Main controller connectors for electrically connecting each of the main controllers 10A and 10B are aligned vertically in the rear face of the backboard 30. In other words, the main controllers 10A and 10B are disposed in the form of layers. Here, as exemplified in FIGS. 8A and 8B, main controllers 10A and 10B are disposed facing one another. As a result, the cross-sectional area of the flow path for the air that flows as a result of the rotation of the cooling fans 71A and 71B can be widened as much as possible. The controllers 10A and 10B overlap in a planar view (with a substantially complete overlap, for example). However, the constitution can be made such that an overlap in a planar view between the processor sections 130A and 130B which constitute the heat-generating parts of the controllers 10A and 10B is avoided and so that there is no concentration of sites with a high temperature in the air flow path.

Drive connectors and, more specifically, 3×4 (three in a vertical direction and four in a horizontal direction) drive connectors which are arranged in a matrix shape are provided on the front face of the backboard 30. In addition, two drive connectors which are aligned in the column direction are provided on the rear face of the backboard 30. As a result, the storage device 1 allows a maximum of fourteen HDD to be connected to the rear face of the backboard 30. Of these HDD, a predetermined number (two, for example) are repair HDD 20 (R) (described subsequently) while the remainder are HDD 20(N) which are pre-installed such that same cannot be exchanged by the user (in cases where the HDD are described by distinguishing between the repair HDD and the other HDD, the reference numerals 20(R) and 20(N) are employed). The repair HDD 20(R) are HDD which are located in the lowermost position and HDD which are located in the uppermost position of the column on the far-right column of the matrix. Although not shown in FIGS. 1 to 4, enclosure 2 has respective repair HDD slots for the insertion of the repair HDD 20(R) and the HDD 20, which are inserted via the repair HDD slot and connected to the front face of the backboard 30, are the repair HDD 20(R). Two repair HDD 20(R) are located in the uppermost and lowermost positions of the far-right column of the matrix as will be described subsequently and the repair HDD slots are also each provided in positions facing these two positions. Hence, the repair HDD slots are also aligned in the column direction and the interval between the repair HDD slots is substantially the same as the thickness of the HDD.

The fact that the HDD 20(N) are mounted so as to not be exchangeable by the user is specifically as follows, for example. In other words, a first inside front bezel part that covers substantially the whole of the area opposite the HDD 20(N) which is the area of the front face of the enclosure is fixed to the front face of the enclosure such that an exchange is impossible. Hence, the HDD 20(N) in the enclosure front part are held via the front face of the enclosure and cannot be pulled out from the front. Further, power devices 50A and 50B are disposed in the vicinity of and directly after the HDD 20(N) which are connected to the rear face of the backboard 30 and the power devices 50A and 50B are secured such that same cannot be removed. As a result, it is impossible to pull out the HDD 20(N) connected to the rear face of the backboard 30 from the rear.

A variety of other types of media drive, such as, for example, hard disk drives, flash memory drives, opto-magnetic drives, and tape device drives may also be adopted in place of the HDD 20. However, in this embodiment, HDD are adopted as described earlier. Further, a variety of communication interfaces can be adopted as the communication interface of the HDD, but, in this embodiment, an SATA (Serial AT Attachment) or SAS (Serial Attached SCSI) interface is used. In other words, in this embodiment, a plurality of HDD which are installed in the enclosure 2 can be constituted by only HDD (SATA HDD) with a SATA interface or an HDD (SAS HDD) with a SAS interface. In addition, HDD are not installed in the enclosure 2 in another member such as a canister. The HDD themselves are installed as is in the enclosure 2.

Figure 29:
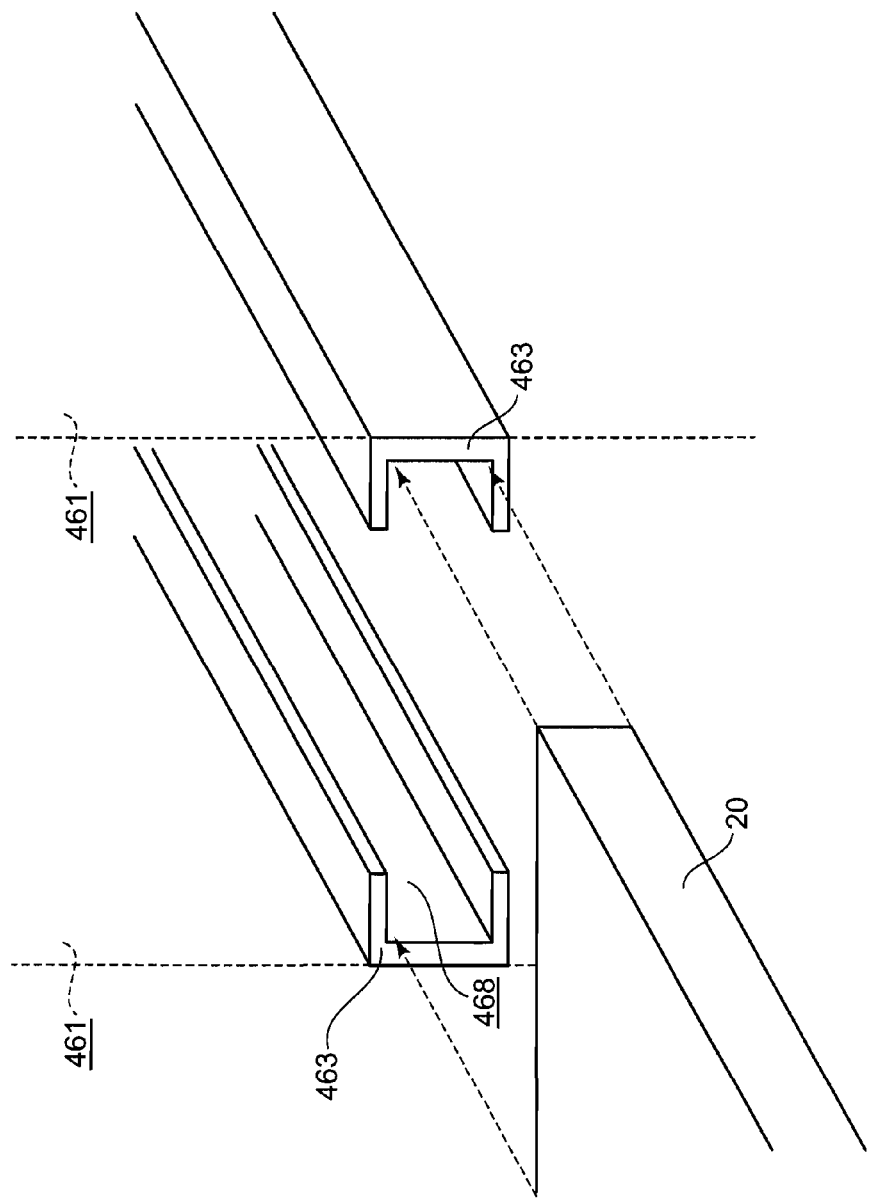
FIG. 29 shows rails for guiding the HDD to the front face of the backboard.

A wall ('column boundary wall' hereinbelow) 461 is provided between the columns of HDD in front of the backboard 30. One role of the column boundary wall 461, as exemplified by FIG. 29, is that of the attachment of U-shaped rails 463 for guiding the HDD inserted via the front face of the enclosure toward the front face of the backboard 30. The height of the U-shaped rails 463 (the height of the path along which the HDD travel) is a height that is close to the height of the HDD 20 and which allows the HDD 20 to travel smoothly. As a result of the U-shaped rails 463, the HDD can also be connected to the front face of the backboard 30 without vertical wobble and the HDD can be connected and then supported without vertical wobble. In addition, one HDD slot 468 is substantially formed with a U-shaped rail 463 on both sides of one HDD 20 (N).

The respective power devices 50A and 50B are disposed on the left of the rear part of the main controllers 10A and 10B, that is, close to the left side of the enclosure 2. Expressed using a different perspective, HDD which are connected to the front face of the backboard 30 moving from the front face of the enclosure toward the rear face of the enclosure close to the left wide of the enclosure 2 (HDD are also sometimes not installed in the leftmost column of the matrix), HDD which are connected to the rear face of the backboard 30, the power devices 50A and 50B and one cooling fan 71A are aligned in that order. The power devices 50A and 50B are also arranged in a layered shape as per the main controllers 10A and 10B.

Batteries 60A and 60B are provided in the space between the main controllers 10A and 10B and the HDD which are connected to the front face of the backboard 30. In other words, batteries 60A and 60B are provided in front of the power devices 50A and 50B (in other words, from another standpoint, upstream of the air flowing through the enclosure). The batteries 60A and 60B can be expected to have a higher temperature dependence than the power devices 50A and 50B (are easily adversely affected by temperature) but a longer life when disposed as illustrated than when disposed close to the rear face of the enclosure. This is because the temperature of the air cooling the batteries 60A and 60B is low in comparison with the temperature when the batteries 60A and 60B are disposed close to the rear face of the enclosure.

The switch subcontroller 321 has a main switch 301 and is disposed in a position that exposes the main switch 301 via the rear face of the enclosure such that same can be manipulated by the user. The battery subcontroller 323 has substantially the same size as the switch subcontroller 321 and is disposed close to the rear face of the enclosure and close to the switch subcontroller 321 (in substantially the same position, for example). The switch subcontroller 321 and battery subcontroller 323 are disposed vertically in parallel and the size thereof in the depth direction in this case is substantially the same size as the total size of two or more cooling fans 71A disposed in series in the depth direction, for example.

The cooling fans (air-cooling fans, for example) 71A and 71B are each disposed in series. When this is described by taking the cooling fan 71A as an example, two or more cooling fans 71A (two, for example) are provided and these two or more cooling fans 71A are disposed in series. As a result, because of the high static pressure in comparison with a case where the two or more cooling fans 71A are aligned in parallel, the cooling target element can be adequately cooled even when a plurality of elements are mounted densely within the enclosure as shown in FIGS. 3 and 4. Further, the cooling fans 71A and 71B are disposed in a symmetrical positional relationship close to the enclosure rear face, for example (oriented toward both sides of the enclosure 2, for example). The cooling fans 71A and 71B are provided close to the through-holes 12A and 12B and are, therefore, so-called pull-type fans.

The flow of air that is produced due to the rotation of the cooling fans 71A and 71B (that is, the flow of air within the enclosure) will be described hereinbelow.

A plurality of through-bores 325 are provided in the outside front bezel 3. A plurality of through-bores is also provided in the inside front bezel interposed between the outside front bezel 3 and front face of the enclosure. Even when the maximum number of HDD are installed, there is a gap between the rows (and/or between the columns) of the matrix of HDD. A plurality of through-bores are provided in the backboard 30.

As a result of the rotation of the cooling fans 71A and 71B, the air outside the enclosure 2 passes through the plurality of through-bores of the outside front bezel 3 and the plurality of through-bores of the inside front bezel before being introduced to the enclosure. Further, this air passes through the gap between the respective HDD and passes through the through-bores of the backboard 30. The air that has passes through the backboard 30 is drawn rearward as a result of the rotation of the cooling fans 71A and 71B and flows through the main controllers 10A and 10B, the batteries 60A and 60B, the HDD connected to the rear face of the backboard 30, and the power devices 50A and 50B and so forth and is exhausted from the through-holes 12A and 12B. As a result, the respective HDD constituting the matrix, main controllers 10A and 10B on the rear face of the backboard 30 (in particular the processor sections which constitute the heat-generating portions), batteries 60A and 60B, HDD, and power devices 50A and 50B are cooled.

Figure 5:
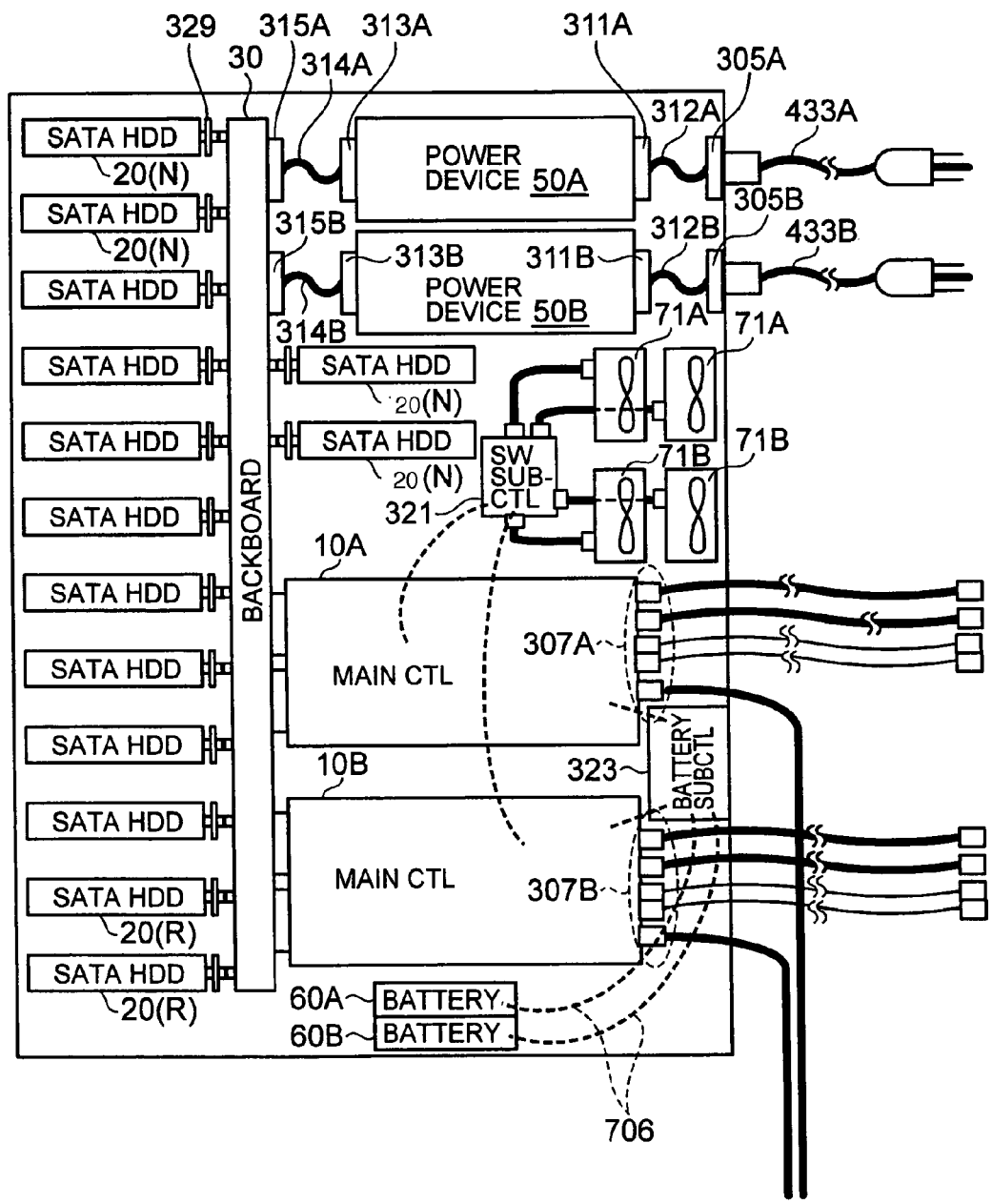
FIG. 5 shows a linear view of the interior of the storage device.

FIG. 5 shows a line diagram in the storage device 1. In the example of FIG. 5, the HDD installed in the storage device 1 are all SATA HDD but the HDD installed in the storage device 1 may instead all be SAS HDD. In addition, in FIG. 5, the controllers are written as 'CTL'.

Ten or fewer HDD 20(N) are connected beforehand to the front face of the backboard 30 and two or fewer HDD 20(N) are connected beforehand to the rear face of the backboard 30. A maximum two repair HDD 20(R) can be connected to the front face of the backboard 30. The HDD 20(N) that are connected beforehand are installed such that same cannot be exchanged by the user whereas the repair HDD 20(R) can be exchanged by the user. The maximum numbers of each of the HDD 20(N) and repair HDD 20(R) need not be limited to those of the above example but the maximum number of repair HDD 20(R) (in other words, the number of repair drive slots) is smaller than the maximum number of HDD 20(N). As a result, only some of the HDD 20 are user-exchange targets and, therefore, the labor of the user can be reduced in comparison with a case where all of the HDD 20 are exchange targets. Further, the 'maximum number of repair HDD 20(R)' above is the maximum number of repair HDD 20(R) that can be installed at the same time and is not the maximum number of HDD that can be repair HDD. For example, three or more HDD 20 can also be used while being exchanged as repair HDD (can be employed, for example). Furthermore, in addition to the HDD 20(N), at least one of the main controllers 10A and 10B, the power devices 50A and 50B, the cooling fans 71A and 71B may be installed so as to be exchangeable by the user. In the description of this embodiment, 'repair HDD' is the name for the sake of convenience for the HDD that can be exchanged by the user and need not necessarily be used for a repair (data repair, for example) and may also be used in other applications. More specifically, for example, the repair HDD 20(R) may also be used as a backup destination HDD for the HDD 20(N).

AC power cables 433A and 433B are connected to the power cable connectors 305A and 305B respectively. The power cable connectors 305A and 305B and AC power input terminals 311A and 311B at the rear end of the power devices 50A and 50B are connected by power cables 312A and 312B (or directly connected). The DC power output terminals 313A and 313B at the front end of the power devices 50A and 50B and the power connectors 315A and 315B provided at the rear face of the backboard 30 are each connected by power cables 314A and 314B. An AC output is input to the AC power input terminals 311A and 311B via the power cables 312A and 312B by the power cable connectors 305A and 305B and is converted to DC power by the power devices 50A and 50B. The DC power is output by the DC power output terminals 313A and 313B and supplied to a variety of devices (HDD 20 and main controllers 10A and 10B, for example) via the power cables 314A and 314B and the backboard 30.

A cable such as a LAN cable is connected to the various communication connectors of the communication connector cables 307A and 307B at the rear end of the main controllers 10A and 10B. The main controllers 10A and 10B are able to communicate with at least one external device (a device outside the storage device 1) such as, for example, a management device that manages the storage device 1, the host computer that transmits an I/O request using a predetermined communication protocol (the iSCSI protocol, for example) to the storage device 1.

In addition, the main controllers 10A and 10B are electrically connected to the switch subcontroller 321 and are able to control the speed of the cooling fans 71A, 71A and cooling fans 71B, 71B by sending control signals to the switch subcontroller 321 (in other words, via the switch subcontroller 321). In other words, the switch subcontroller 321 controls the speed of the cooling fans 71A, 71A and cooling fans 71B, 71B in accordance with control signals from the main controllers 10A and 10B. The switch subcontroller 321 is a circuit substrate with smaller surface area than that of the main controllers 10A and 10B.

Further, the main controllers 10A and 10B are electrically connected to the battery subcontroller 323 and are able to control the discharge of the batteries 60A and 60B by sending control signals to the battery subcontroller 323 (in other words, via the battery subcontroller 323). In other words, the battery subcontroller 323 controls the discharge of the batteries 60A and 60B in accordance with control signals from the main controllers 10A and 10B. The battery subcontroller 323 is a circuit substrate that has a smaller surface area that that of the main controllers 10A and 10B. The battery subcontroller 323 and batteries 60A and 60B are connected by means of a cable 706.

In cases where the power output from the power devices 50A and 50B is disrupted, the batteries 60A and 60B are able to supply power of a predetermined voltage to each of the HDD 20 and main controllers 10A and 10B. In the period during which the power is being backed up by the batteries 60, the main controllers 10A and 10B are able to write data that is stored in the cache memory (See FIG. 6) that will be described subsequently to the HDD 20.

Figure 6:
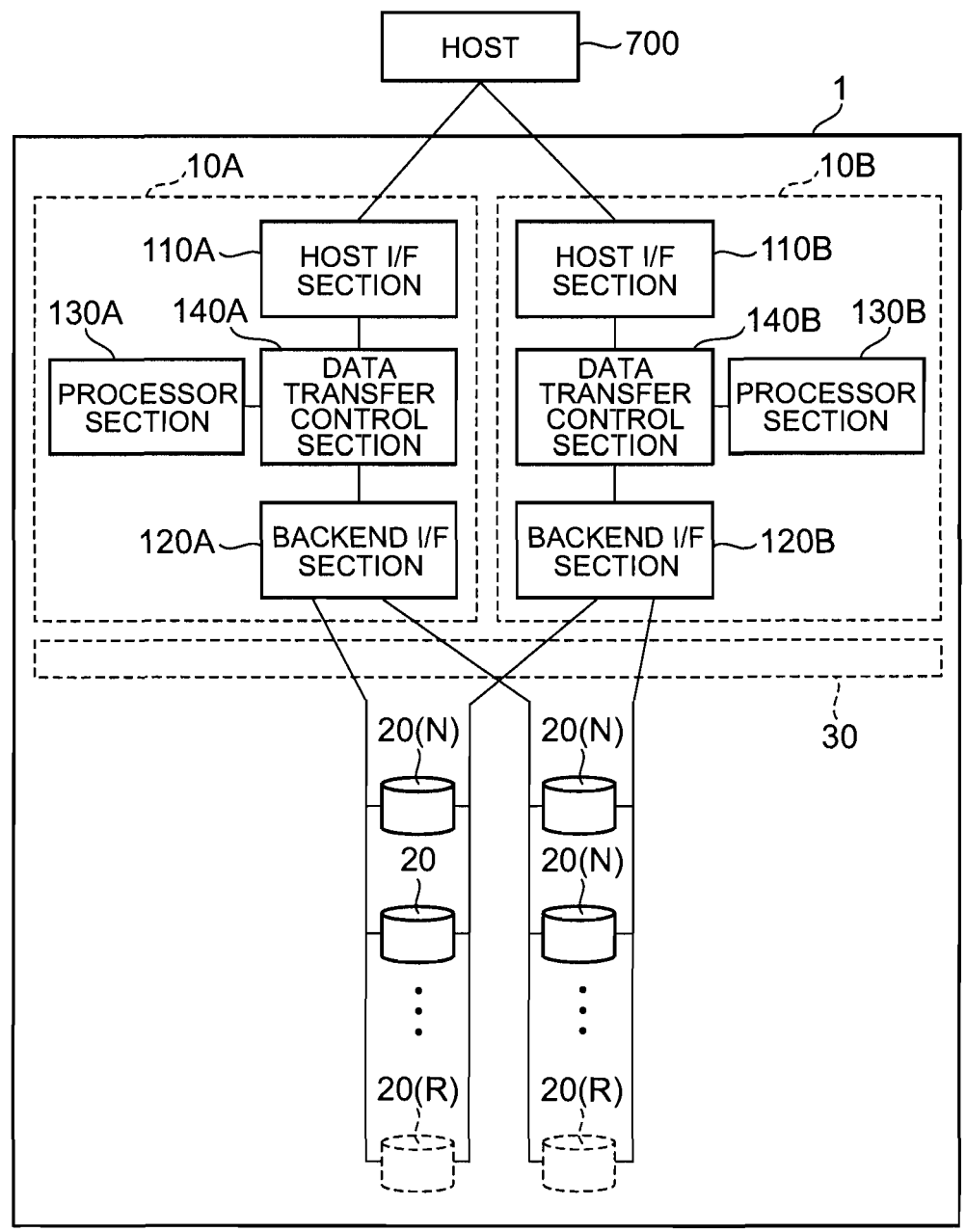
FIG. 6 shows a functional block diagram of the storage device.

FIG. 6 shows a functional block diagram of the storage device 1.

When the description is provided by taking the main controller 10A by way of an example, the main controller 10A comprises a host interface section 110A, a backend interface section 120A, a processor section 130A, and a data transfer control section 140A. The host interface section 110A exchanges data with the host computer 700. The backend interface section 120A exchanges data with each of the HDD 20. The processor section 130A controls the overall operation of the storage device 1. The data transfer control section 140A controls the transfer of data read from the respective HDD 20 as well as the data received from the host computer 700.

The backend interface sections 120A and 120B are each connected to the respective HDD 20. Therefore, even in cases where there is a fault with either the backend interface section 120A or the communication path (the communication path between the backend interface section 120A and the respective HDD 20), it is possible to access each HDD 20 via the other backend interface section 120B and the other communication path.

Figure 7:
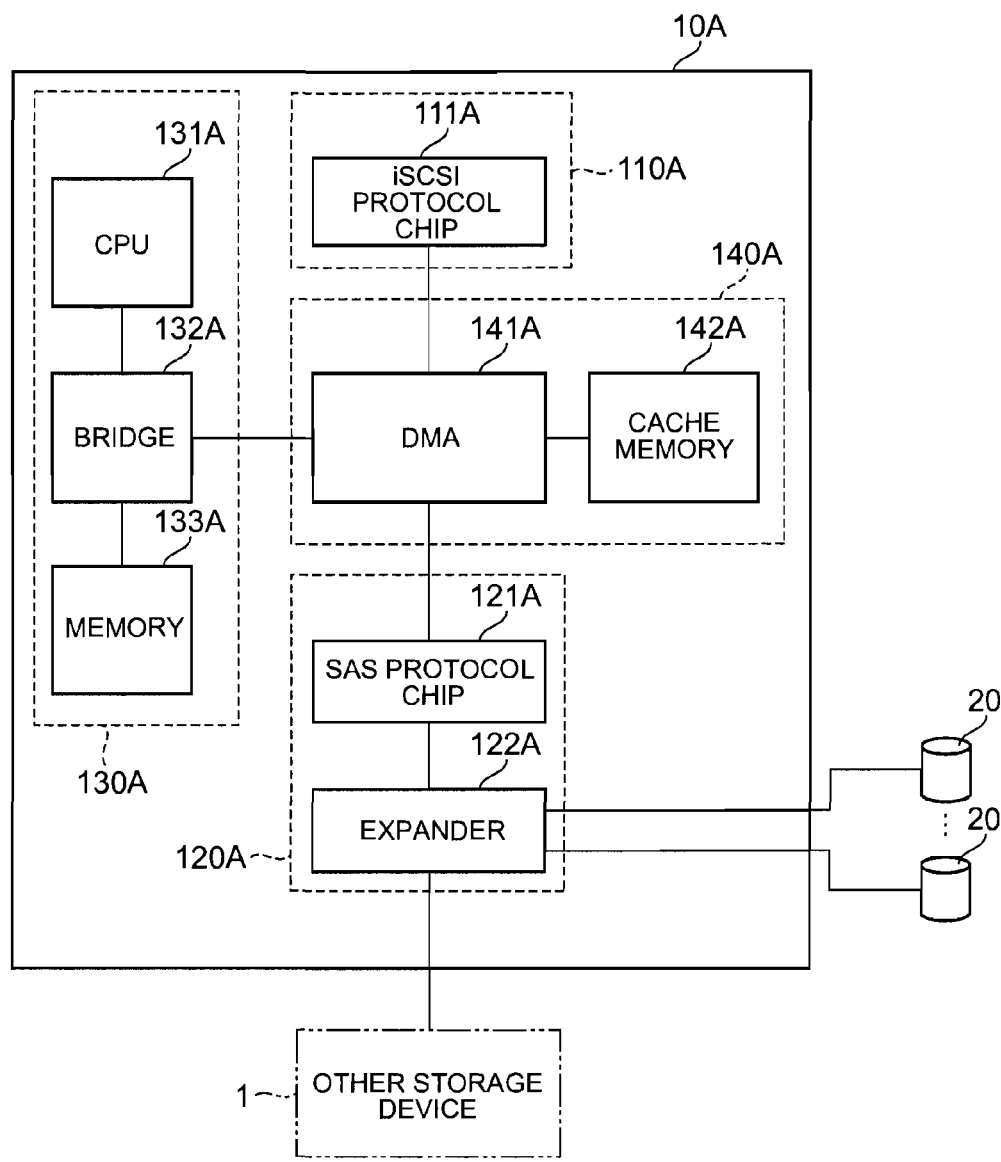
FIG. 7 is a block diagram of the constitution of the main controller.

FIG. 7 is a block diagram showing the constitution of the main controller 10A.

The host interface section 110A comprises an iSCSI (internet Small Computer System Interface) protocol chip 111, for example. The protocol chip 111A is a circuit for communicating with the host computer 700 on the basis of the iSCSI protocol. The communication with the host computer 700 may be carried out using a protocol other than the iSCSI protocol.

The backend interface section 120A comprises an SAS protocol chip 121A and an expander 122A, for example. The SAS protocol chip 121A is a circuit for communicating with the respective HDD 20 on the basis of the SAS protocol. The expander 122A is an expansion port (a switch device, for example) for connecting the main controller 10A with an external device (the HDD 20 and a separate storage device 1, for example).

The processor sections 130 comprise, for example, a CPU 131A, a bridge 132A, and a memory 133A. The bridge 132A connects the CPU 131A and the memory 133A. In addition, the CPU 131 is connected to the DMA circuit 141 by the bridge 132A. The CPU 131 is able to process 110 requests from the host computer 700 by reading and executing various programs that are pre-stored in the memory 133A.

The data transfer control section 140A comprises a DMA (Direct Memory Access) circuit 141A and a cache memory 142A, for example. The DMA circuit 141A is a circuit whereby the respective protocol chips 111A and 121A are able to access the cache memory 142A without the intervention of the CPU 131A. The cache memory 142A is a memory for temporarily storing data received from the host computer 700 and data that are read from the HDD 20.

The respective protocol chips 111A and 121A and the DMA circuit 141 are connected by a serial transfer interface such as an interface known as a PCI Express. Likewise, the bridge 132A and DMA circuit 141A are connected by the serial transfer interface.

The storage device 1 can be connected to another storage device 1. Accordingly, data stored in the storage device 1 can be copied to the other storage device 1 (the storage device 1 can be replaced, for example). The communication connector for performing such a data transfer between the storage devices is contained in the communication connector groups 307A and 307B of the main controllers 10A and 10B, for example. The main controllers 10A and 10B are able to copy data stored in the storage device 1 to the other new storage device 1 in accordance with instructions from the device controlling the replacement of the storage device 1, for example.

In cases where any of the pre-installed HDD 20(N) is obstructed, for example, the main controllers 10A and 10B is able to restore the data by performing a so-called correction copy with the repair HDD 20(R) (that is, the repair HDD 20(R) can be used instead of the obstructed HDD 20(N)). Furthermore, when the number of obstructed HDD 20(N) exceeds the number of repair HDD 20(R) or when a fault other than one with the HDD 20 is detected, the main controllers 10A and 10B are able to copy the data in the storage device 1 to the other storage device 1.

<Determination of a Suitable Drive Connector Position in which the HDD 20(N) is not Connected>

As mentioned earlier, the storage device 1 according to this embodiment can comprise a maximum of fourteen HDD 20 including repair HDD 20(R) and, of these, the maximum number of HDD 20(N) is twelve. A RAID group of predetermined RAID levels (RAID6, for example) is connected by means of twelve or fewer HDD 20(N).

Stated more broadly, the maximum number X of HDD can be installed in the storage device 1 (X is an integer of three or more, for example). Of these, the maximum number Y of HDD 20 that can be pre-installed is a number that is obtained by subtracting the maximum number Z of repair HDD 20(R) that can be installed (where Z is an integer of 1 or more, for example) from X (that is, Y=X−Z). The storage device 1 does not necessarily have Y HDD 20(N) pre-installed therein and, depending on the specifications, the number of HDD 20(N) is sometimes less than Y.

More specifically, the number of HDD 20(N) is any of six, eight, or twelve, for example. In cases where the number of HDD 20(N) is six, the six HDD 20(N) can be constituted by four HDD (D) and two HDD (P). When the number of HDD 20(N) is eight, the eight HDD 20(N) can be constituted by six HDD (D) and two HDD (P). In cases where the number of HDD 20(N) is twelve, the twelve HDD 20(N) can be constituted by nine HDD (D), two HDD (P) and one HDD (S).

In other words, the HDD can be broadly classified into three types depending on the application. The HDD that belong to the first type are HDD which are used for the storage of data. The HDD that belong to the first type include HDD (D) for storing data elements and HDD (P) for storing parity calculated from the plurality of data elements. The HDD belonging to the second type are spare HDD (S). The spare HDD (S) are used in cases where a fault occurs with any of the HDD (HDD(D) and HDD(P)) belonging to the first type and are prepared HDD. The HDD that belong to the third type are repair HDD 20(R). The repair HDD 20(R) can be used in cases where at least a certain type of HDD is obstructed and, therefore, may also be called another spare HDD.

In cases where the number of pre-installed HDD 20(N) is less than the maximum number of HDD 20(N) (in this case six or eight, for example), HDD are still not connected to any drive connector that exists on the front face or on the rear face of the backboard 30. In other words, a spare drive connector then exists. There is the risk that an adverse effect will occur due to the cooling performance and/or for another reason because any of the drive connectors is spare.

Therefore, spare drive connectors are determined through the installation of the HDD 20(N) in accordance with all of the following rules 1 to 5 in this embodiment. Each of these rules will be described hereinbelow with reference to the schematic diagram of the drive connector matrix which is exemplified in FIG. 9. In the drive connector matrix, there are row 1, row 2, and row 3 working from top to bottom and column 1, column 2, column 3, and column 4 working from left to right. In addition, a column that exists on the rear face of the backboard 30 and behind column 1 is column 1'. Further, the positions of the drive connectors (cells in FIG. 9) are expressed as a combination (row: column).

(Rule 1): the HDD 20(N) are connected in order of priority to drive connectors located in front of devices of low temperature life dependence (in other words, upstream of the air flow);

(Rule 2): spare drive connectors should not be successive in each column;

(Rule 3): The positions of two drive connectors that correspond with two repair HDD 20(R) respectively are in column 4 (example of far-right column) (may also be column 1);

(Rule 4): Spare drive connectors should, as far as possible, not be successive in the row direction from column 3 to column 4 that straddle the horizontally disposed main controllers 10A and 10B; and (Rule 5): HDD 20(N) are connected in order of priority to the drive connectors belonging to the bottom row.

Figure 9:
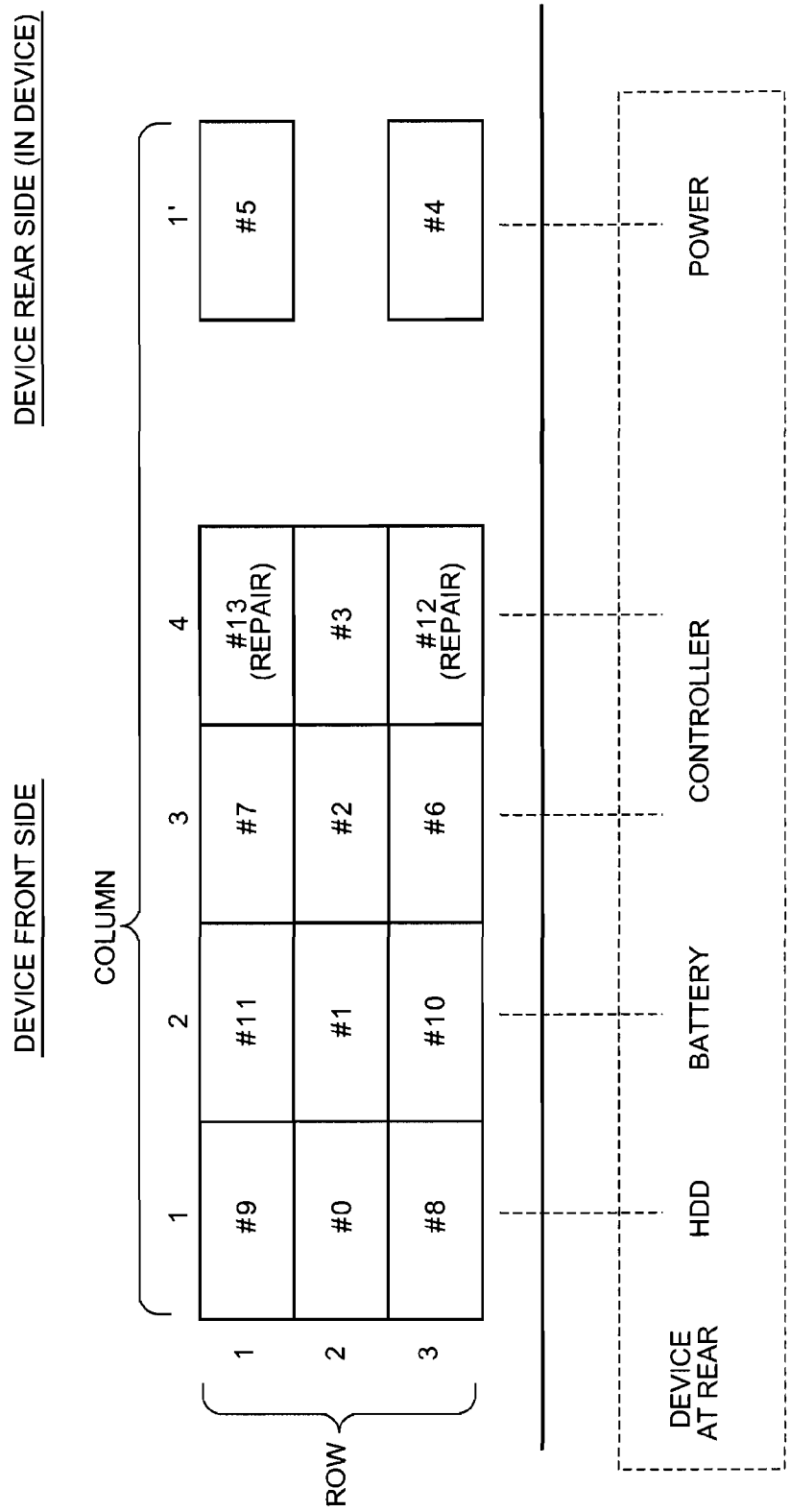
FIG. 9 is a schematic view of a drive connector matrix.

The result of following Rules 1 to 5 are as shown in FIG. 9. The numbers in the respective cells of FIG. 9 indicate the ranking order in which the HDD 20(N) are installed. The lower the number, the higher the priority. This will be described in specific terms hereinbelow.

The devices with the highest temperature life dependence among the batteries, HDD, CPU (processor) and power devices, for example, are the batteries; the devices with the next highest temperature life dependence are the HDD; the device with the next highest temperature life dependence is the CPU, and the devices with the lowest temperature life dependence are the power devices. The batteries 60A and 60B are behind column 2 (downstream of the cooling air stream). The HDD are behind column 1 if same are connected to the drive connector belonging to column 1'. The CPU is installed in the main controllers 10A and 10B and, therefore, behind columns 3 to 4. The power devices 71A and 71B are behind column 1'. Hence, in accordance with (Rule 1), HDD 20(N) are preferentially connected to column 1', HDD 20(N) are then preferentially connected to columns 3 and 4, and HDD 20(N) are preferentially connected to column 1, and the column 2 has the lowest ranking order for the connection of the HDD 20(N). According to (Rule 1), the assignment of a cool air stream for each type of device that exists behind the drive connector is optimized and, therefore, each type of temperature-dependent device is afforded a longer life.

In accordance with (Rule 2), a ranking order in which row 2 of rows 1 to 3 is afforded the highest priority (the ranking order for the connection of the HDD 20(N)) is established. In accordance with (Rule 2), even when a first inside front bezel part is, per chance, removed, because the HDD slots succeed each other vertically, the user finds it difficult (substantially impossible) to insert his hand inside the enclosure via the front face of the enclosure and, consequently, protection of the interior of the storage device from static electricity as well as contact by the user with the active parts (the wiring and terminals and so forth on the circuit board, for example) is sought.

In accordance with (Rule 3), in combination with (Rule 2), the positions of the two drive connectors to which repair HDD 20(R) are connected are (row 1: column 4) and (row 3: column 4). In accordance with (Rule 3), in comparison with a case where the repair HDD 20(R) are connected to column 2 and column 3, the insertion and removal of the repair HDD 20(R) is performed easily. In addition, because the repair HDD 20(R) are not necessarily installed and the main controllers 10A and 10B are behind column 4, an increase in the amount of cool air stream for the processor can be expected.

In accordance with (Rule 4), in combination with (Rule 3), HDD 20(N) are most preferentially connected to column 3 of columns 1 to 4. In accordance with (Rule 4), prevention of a concentrated cool air stream on the main controllers 10A and 10B can be expected.

In accordance with (Rule 5), HDD 20(N) are preferentially connected to row 3 among rows 1 to 3 and then HDD 20(N) are preferentially connected to row 2. In accordance with (Rule 5), the bottom side of the enclosure 2 can be weighted more heavily than the top side of the enclosure in order to render the enclosure 2 stable.

According to FIG. 9, the priority levels 0 to 13 are determined. However, because there are a minimum of six HDD 20(N) in this embodiment, HDD 20(N) are compulsorily connected to the drive connectors corresponding with the priority levels 0 to 5.

<Prevention of Erroneous Connections that Accompany the Exclusivity of the Storage Device>

As mentioned earlier, a plurality of HDD 20 that are installed in the storage device 1 are constituted only by SAS HDD or only by SATA HDD. Hereinafter, a storage device in which the plurality of HDD 20 are constituted only by SAS HDD (in other words, a SAS-dedicated storage device) will be referred to as a 'SAS storage device', a storage device in which a plurality of HDD 20 are constituted by only SATA HDD (in other words, a SATA-dedicated storage device) is referred to as a 'SATA storage device'. The main controllers 10A and 10B installed in a SAS storage device 1 are constituted to communicate using SAS signals and the main controllers 10A and 10B installed in a SATA storage device 1 are constituted to communicate using SATA signals.

Figure 10A:
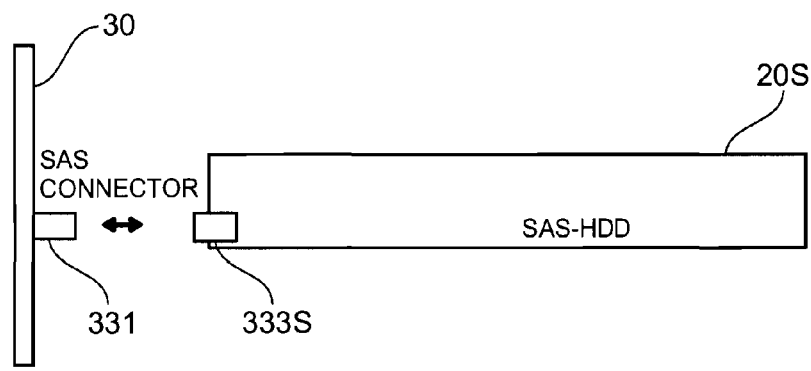
FIG. 10A shows a valid connection of a SAS HDD.
Figure 10B:
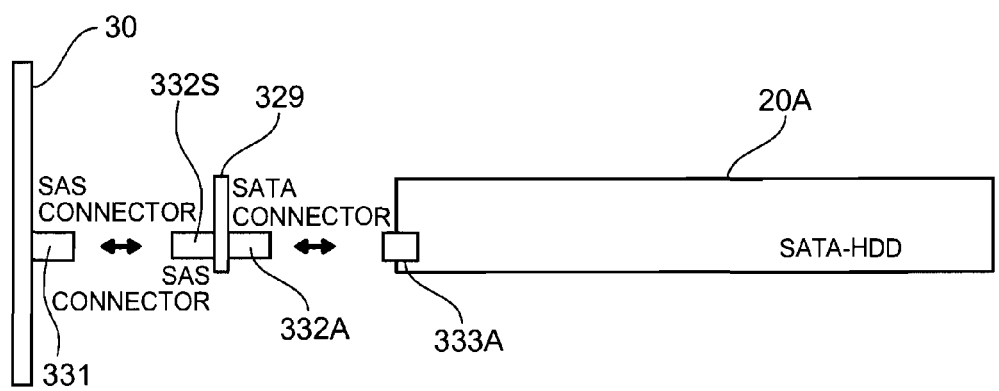
FIG. 10B shows a valid connection of a SATA HDD.

FIG. 10A shows a valid SAS HDD connection and FIG. 10B shows a valid SATA HDD connection.

As can be seen from FIGS. 10A and 10B, in this embodiment, the specifications of the backboard 30 are common to both the SAS storage device 1 and the SATA storage device 1. More specifically, for example, the drive connector provided on the backboard 30 is a connector used for SAS ('SAS connector' hereinbelow) 331.

For this reason, as shown in FIG. 10A, for the SAS HDD 20S, by connecting the SAS connector 333S on the SAS HDD 20S ('HDD-side SAS connector' hereinbelow) to the SAS connector ('backboard-side SAS connector' hereinbelow) 331 on the backboard 30 as they are, the SAS HDD 20S is electrically connected and therefore then able to communicate with the main controllers 10A and 10B, for example.

However, as shown in FIG. 10B, for the SATA HDD 20A, the SATA connector (the 'HDD-side SATA connector' hereinbelow) 333A on the SATA HDD 20A is not connected as is to the backboard-side SAS connector 331. This is because, although the SATA HDD 20A can be physically connected to the backboard 30, same is not electrically connected. Hence, as shown in FIG. 10B, the SATA HDD 20A must be connected to the backboard 30 via a dongle board 329 constituting an interface conversion device (a device that mutually converts a SATA interface and SAS interface). More specifically, the dongle board 329 is a small circuit substrate. The dongle board 329 has a SATA connector (dongle-side SATA connector hereinbelow) 332A on one side and a SAS connector (a dongle-side SAS connector hereinbelow) 332S on the other side. By connecting the dongle-side SATA connector 332A and the HDD-side SATA connector 333A and connecting the dongle-side SAS connector 332S and backboard-side SAS connector 331, the SATA HDD 20A is electrically connected and thus able to communicate with the main controllers 10A and 10B, for example.

Because the drive connector that is provided on the backboard 30 is SAS connector 331, there is the possibility of an erroneous SATA HDD connection and, in particular, an erroneous repair SATA HDD 20A(R) connection taking place. The following three cases may be considered as erroneous connection cases.

(Erroneous connection case 1) A case where the user forgets to attach the dongle board 329 to the SATA storage device 1 when inserting the SATA HDD 20A and connecting same to the backboard 30. The SATA HDD 20A is physically connected to the backboard 30 but not electrically connected thereto (See FIG. 11A).

Figure 11A:
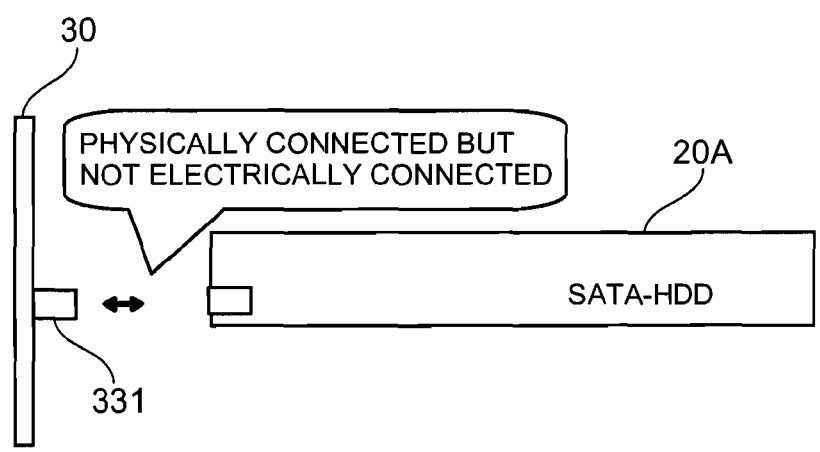
FIG. 11A shows an (erroneous connection case 1) and an (erroneous connection case 3)
Figure 11B:
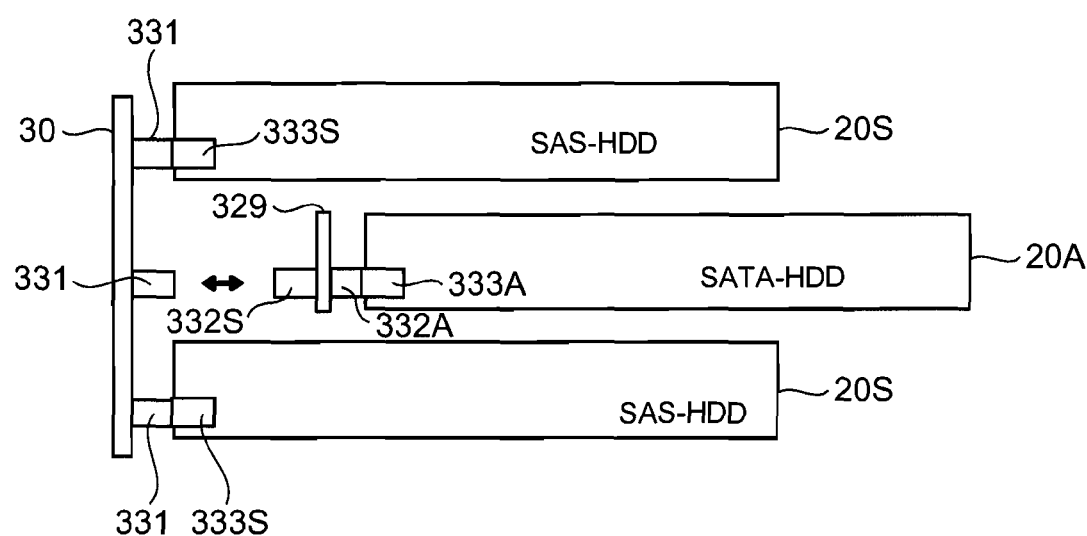
FIG. 11B shows an (erroneous connection case 2)

(Erroneous connection case 2) A case where the SATA HDD 20A is inserted in the SAS storage device 1 and connected to the backboard 30. In this case also, as shown in FIG. 11A, the SATA HDD 20A is physically connected to the backboard 30 but not electrically connected thereto.

(Erroneous connection case 3) A case where the SATA HDD 20A to which the dongle board 329 has been connected is inserted in the SAS storage device 1 and connected to the backboard 30.

In this embodiment, any of the erroneous connections of (erroneous connection case 1) to (erroneous connection case 3) can also be prevented by means of a variety of measures that will be described hereinbelow.

<Prevention of Erroneous Connections of (Erroneous Connection Case 1) and (Erroneous Connection Case 3)>

Although the SATA HDD 20A can be physically connected to the SAS connector, the SAS HDD 20S cannot also be physically connected to the SATA connector. When this kind of connector connective relationship is considered, the following measures are taken in this embodiment.

Figure 12A:
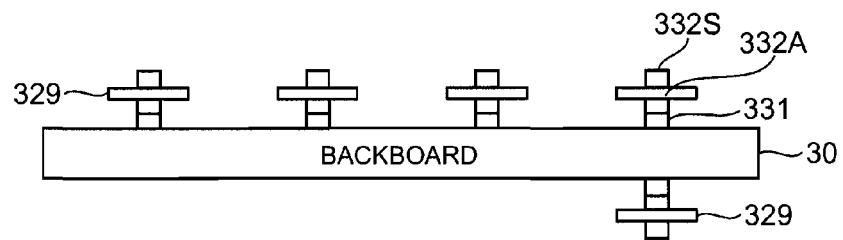
FIG. 12A is an upper view of a backboard in which the SAS connector is pre-provided with a dongle board.

In other words, as shown in FIG. 12A, the dongle board 329 is connected beforehand (at least before the storage device 1 is shipped) to all of the SAS connectors 331 of the backboard 30 of the SATA storage device 1. As a result, the erroneous connection of (erroneous connection case 1) can be prevented. More specifically, even when the repair SATA HDD 20A(R) is inserted by the user without attaching the dongle board 329, the repair SATA HDD 20A(R) is electrically connected to the backboard 30. In addition, even when a repair SAS HDD 20S(R) is inserted by mistake to the SATA storage device 1, the dongle board 329 is connected beforehand to the backboard 30 and the dongle-side SATA connector 332A is facing toward the front face. Hence, the repair SAS HDD 20S(R) that has been inserted by mistake cannot also be physically connected to the backboard 30.

Figure 30:
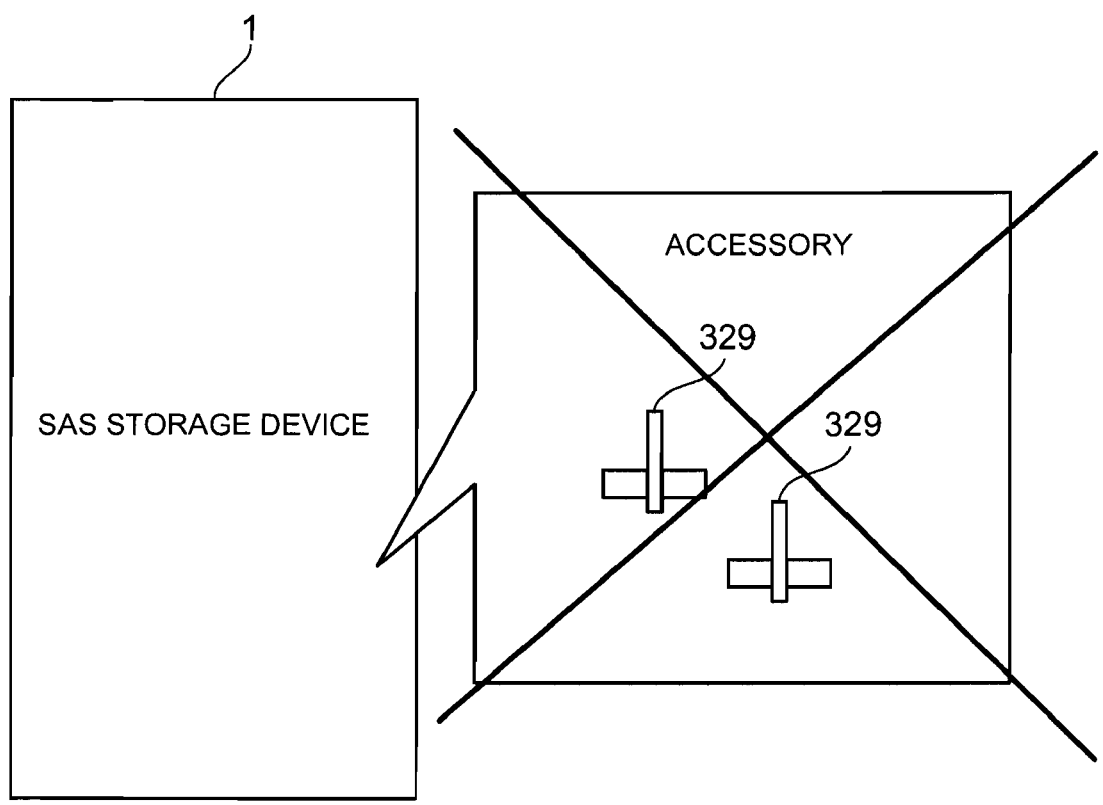
FIG. 30 is an explanatory diagram of a method for preventing an erroneous connection (of the erroneous connection case 3)

In addition, as shown in FIG. 30, SAS storage device 1 may be introduced by the user without the dongle board 329 being attached as an accessory. Accordingly, the erroneous connection of the (erroneous connection case 3) can be prevented. More specifically, because the user is not provided with the dongle board 329, it is possible to prevent the insertion into the SAS storage device 1 by attaching the dongle board 329 to the repair SATA HDD 20A(R).

<Prevention of the Erroneous Connection of (Erroneous Connection Case 2)>

Figure 12B:
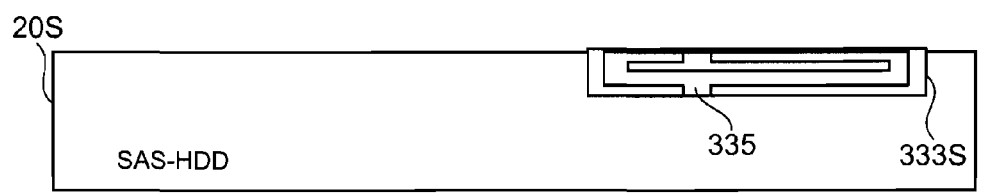
FIG. 12B is a rear view of the SAS HDD.
Figure 12C:
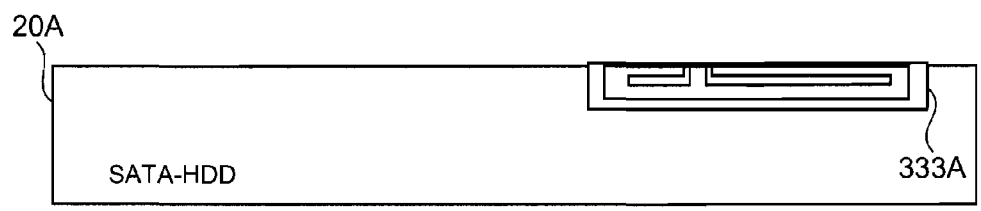
FIG. 12C is a rear view of a SATA HDD.

Because the shape of the HDD-side SAS connector 333S and HDD-side SATA connector 333A are substantially the same, not only the SAS HDD 20S but also the SATA HDD 20A can be physically connected as is to the backboard-side SAS connector 331. However, there is a slight discrepancy in the shapes of the HDD-side SAS connector 333S and HDD-side SATA connector 333A. More specifically, as shown in FIG. 12B, the tip of the HDD-side SAS connector 333S is provided with a cutout 335. However, as shown in FIG. 12C, the tip of the HDD-side SATA connector 333A is not provided with such a cutout.

Figure 12D:
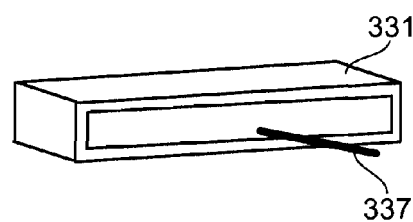
FIG. 12D is a perspective view of a backboard-side SAS connector of the SAS storage device.

Therefore, the backboard-side SAS connector 331 in the SAS storage device 1 is constituted with a focus on this discrepancy. More specifically, as shown in FIG. 12D, a protrusion (pin, for example) 337 that extends from the end face of the backboard-side SAS connector 331 toward the rear is provided in a position facing the cutout 335 of the connected HDD-side SAS connector 333S of the backboard-side SAS connector 331 of the backboard 30 of the SAS storage device 1 (the protrusion will be called the 'first protrusion' hereinbelow). As a result, the erroneous connection of the (erroneous connection case 2) can be prevented. In other words, if the repair HDD 20(R) that is inserted in the SAS storage device 1 is a repair SAS HDD 20S(R), the first protrusion 337 penetrates the cutout 335 in the HDD-side SAS connector 330S of the HDD 20S(R) relatively before the HDD-side SAS connector 330S finally fits into the backboard-side SAS connector 331 (that is, to establish a valid connection). However, if the repair HDD 20(R) that has been inserted into the SAS storage device 1 is a repair SATA HDD 20A(R), the tip of the HDD-side SATA connector 330A of the HDD 20A(R) (thickness forming the outer perimeter surface and the inside perimeter surface) collides with the first protrusion 337 and cannot progress in the insertion direction mentioned earlier. Hence, an erroneous connection of the repair SATA HDD 20A(R) can be prevented.

<Modified Example for the Prevention of the Erroneous Connection of the (Erroneous Connection Case 2)>

Figure 13A:
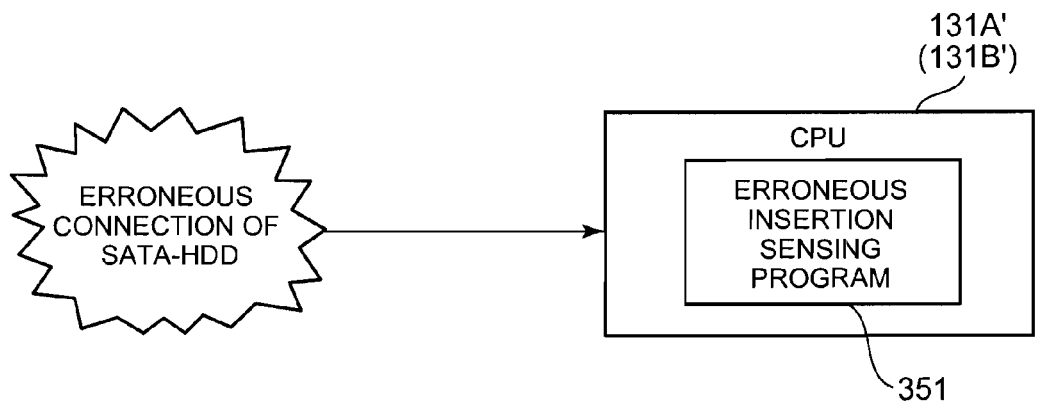
FIG. 13A serves to illustrate a modified example for the prevention of the erroneous connection (of erroneous connection case 2)

As shown in FIG. 13A, the CPU 131A' and 131B' that are installed in the main controllers 10A and 10B execute an erroneous connection sensing program 351. In cases where the computer program is the subject hereinbelow, the processing is actually carried out by a CPU that executes this computer program.

Figure 13B:
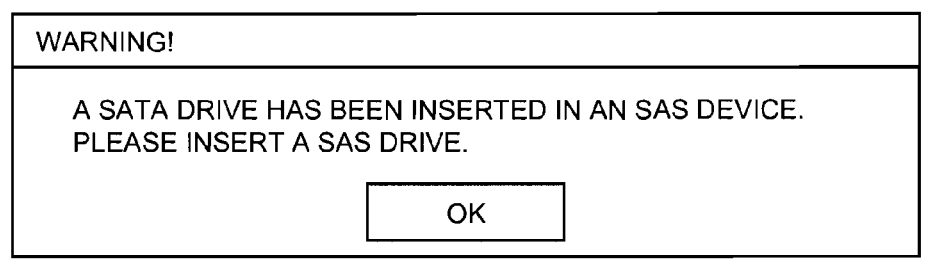
FIG. 13B shows an example of a display screen that displays a warning to the effect that a SATA HDD has been erroneously connected, according to the modified example.

The erroneous connection sensing program 351 senses the fact that a SATA HDD 20A has been erroneously connected to the SAS storage device 1 and, in cases where this is sensed, transmits information for displaying a warning to the effect that a SATA HDD has been connected by mistake to a predetermined device such as the management computer of the SAS storage device 1 so that the predetermined device is made to display the warning (See FIG. 13B).

Methods of sensing an erroneous connection include a method whereby a signal indicating the type of connected HDD is input to processor sections 130A' and 130B' of the main controllers 10A and 10B respectively via the backboard 30. Other methods of sensing include, for example, a method according to which a specified electrical signal is input to the processing sections 130A' and 130B' in cases where a SATA HDD 20A is connected but not input to the processing sections 130A' and 130B' in cases where a SAS HDD 20S is connected, for example. Yet another sensing method is a method according to which the erroneous connection sensing program 351 issues a command (an inquiry, for example) which cannot be interpreted by a SATA HDD 20A but can be interpreted by an SAS HDD 20S and senses that a SATA HDD 20A has been erroneously connected in cases where a predetermined response to the command is not received.

<Modified Example for Preventing the Erroneous Connection of the (Erroneous Connection Case 3)>

A method that involves devising the constitution of the backboard and dongle board can also be adopted in place of the method in which the dongle board 329 is not attached to the SAS storage device 1.

Figure 14A:
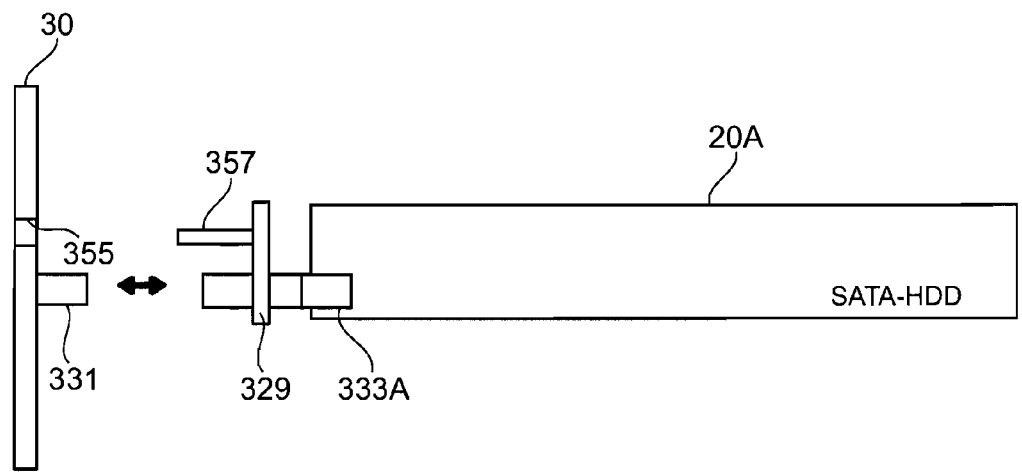
FIG. 14A shows the backboard and SATA HDD of the modified example for the prevention of an erroneous connection (of the erroneous connection case 3) from the side.

As shown in FIG. 14A, a hole (a sunken or penetrating hole, for example) 355 is provided in the vicinity (within an area of the backboard 30 opposite the dongle board 329 in a case where the dongle board 329 is connected to the SAS connector 331, for example) of the SAS connector 331 to which the HDD 20 is connected (at least the SAS connector 331 to which a repair HDD 20 (R) is connected) in the surface having the SAS connector 331 of the backboard 30'. In addition, a protrusion (a pin, for example) 357 that extends perpendicularly to the surface is provided on the surface with the dongle-side SAS connector 332S of a dongle board 329'. Hereinbelow, protrusion 357 is called the 'second protrusion 357' and the hole 355 is called the 'protrusion-receiving hole 355'.

The tip of the second protrusion 357 is located closer to the tip than the tip of the dongle-side SAS connector 332S. In other words, the length from the surface with the dongle-side SAS connector 332A of the dongle board 329' is greater for the second protrusion 357 than for the dongle-side SAS connector 332S. In other words, the length of the second protrusion 357 is of a certain length so that the tip of the second protrusion 357 is located in the surface of backboard 30' before the dongle-side SAS connector 332S substantially fits into the backboard-side SAS connector 331.

The positional relationship of the second protrusion 357 and protrusion-receiving hole 355 is a positional relationship such that the second protrusion 357 goes into the protrusion-receiving hole 355 in cases where the SATA HDD 20A to which the dongle board 329' is attached is connected to the backboard-side SAS connector 331 (in other words, a positional relationship in which the second protrusion 357 and protrusion-receiving hole 355 face each other).

In cases where the storage device 1 is the SATA storage device 1, the repair SATA HDD 20A(R) to which the dongle board 329' is attached is inserted in the repair HDD slot and the second protrusion 357 goes into the protrusion-receiving hole 355 such that the dongle-side SAS connector 332S fits into the backboard-side SAS connector 331, whereby the repair SATA HDD 20A(R) is electrically connected to the backboard 30.

Figure 14B:
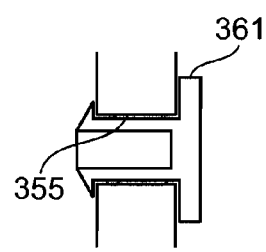
FIG. 14B shows part of the cross-section of the backboard of the SAS storage device of this modified example.
Figure 14C:
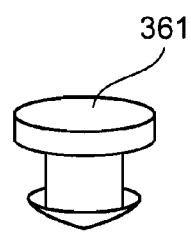
FIG. 14C is a perspective view of a member that is embedded in a hole that is provided in the backboard according to the modified example.

However, in cases where the storage device 1 is a SAS storage device 1, the SAS storage device 1 is shipped with the protrusion-receiving hole 355 of the backboard 30 covered (embedded, for example). As a result, the erroneous connection to the SAS storage device 1 of the repair SATA HDD 20A(R) to which the dongle board 329' is attached can be prevented. This is because the tip of the second protrusion 357 from the dongle board 329' collides with the member that is the lid of the protrusion-receiving hole 355 before the dongle-side SAS connector 332S substantially fits into the backboard-side SAS connector 331. The protrusion-receiving hole 355 can be covered by means of a variety of members. More specifically, as shown in FIG. 14B, for example, the protrusion-receiving hole 355 can be covered by an insulating member such as plastic (rivet-shaped member, for example) 361 (FIG. 14C shows a perspective view of the member 361).

The measures described with reference to FIGS. 14A to 14C may be effected in order to prevent an erroneous connection of at least the repair HDD while such measures need not be carried out for the HDD 20(N). This is because the HDD 20(N) are HDD that are pre-installed before the storage device 1 is shipped and are outside the realm of maintenance by the user (not exchange targets).

<Prevention of the Application of Static Electricity from the Front Face of the Enclosure to Inside the Enclosure>

In this embodiment, measures for preventing static electricity from being applied within the enclosure from the front face of the enclosure are effected for repair HDD slots and also the other HDD slots.

Figure 15A:
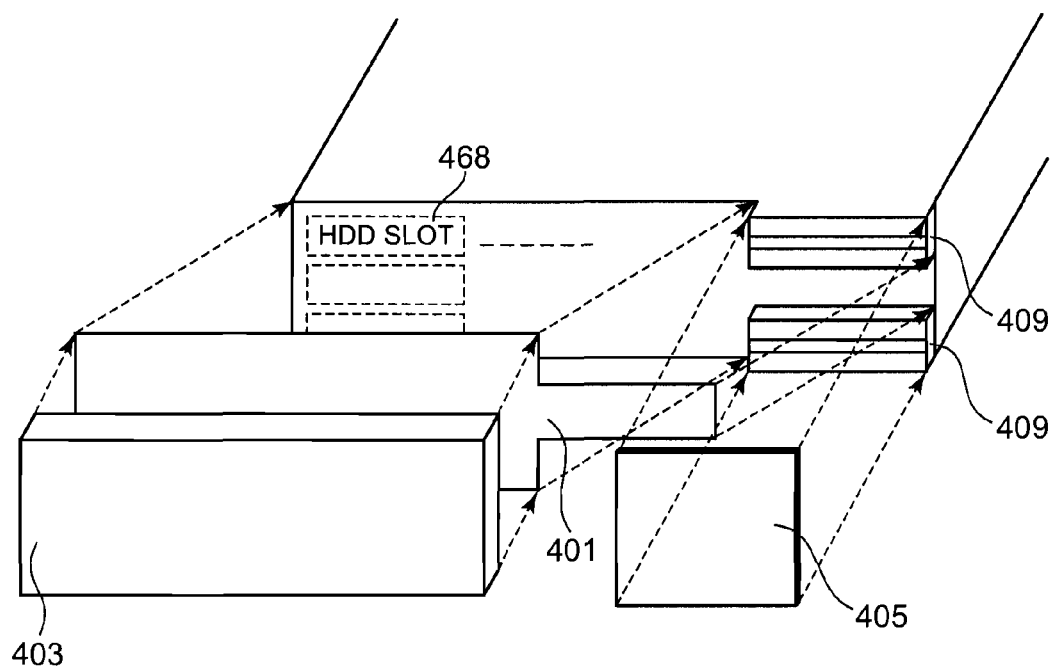
FIG. 15A shows the attachment of a first inside front bezel and a second inside front bezel to the front face of the enclosure.

More specifically, as shown in FIG. 15A, a first inside front bezel 402 that covers the area occupied by HDD slots other than the repair HDD slots (in other words, the area in which the HDD 20(N) exists) is attached to the front face of the enclosure. The first inside front bezel 402 is constituted, for example, by a conductive plate (a metallic plate, for example) 401 of a shape that covers the area occupied by HDD slots other than the repair HDD slots and an insulating plate (a plastic plate, for example) 403 that is bonded to the surface of the conductive plate (sheet metal, for example) 401. The insulating plate 403 is thick in comparison with the conductive plate 401, for example.

Figure 15B:
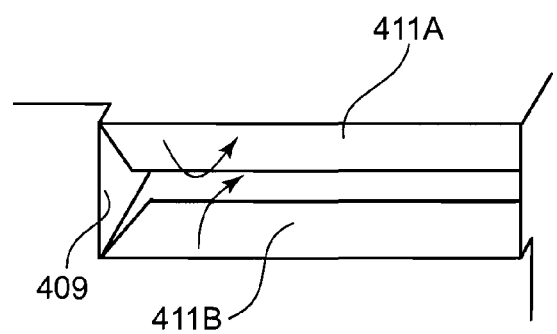
FIG. 15B shows a door that is provided in the repair HDD slot.

In addition, conductive doors (metallic doors, for example) that open and close the repair HDD slot 409 are provided. As shown in FIG. 15B, the doors are the so-called double doors 411A and 411B and are constituted to open rearward in the same direction as the direction in which the repair HDD 20(R) are inserted. The repair HDD slots 409 are provided in positions that are spaced apart in a forward direction equal to or more than the respective widths K of each of the double doors 411A and 411B from the front face (the face opposite the face having the HDD-side SAS connector or the HDD-side SATA connector) of the connected repair HDD 20(R) (if the widths of the double doors 411A and 411B are different, the repair HDD slots 409 are provided in positions spaced apart in a forward direction by longer widths). Hence, two repair HDD slots 409 are located forward of the position of the other HDD slot 468, in other words, in front of the enclosure front face. Because the doors are not single doors but rather double doors, the distance required to withdraw the repair HDD slots 409 in a forward direction can be kept short and, therefore, the size of the storage device 1 in the depth direction can be suppressed. As shown in FIG. 15A, a second inside front bezel 405 is attached to two repair HDD slots 409 that are located in front of the enclosure front face. The second inside front bezel 405 is an insulating plate, for example. More specifically, the second inside front bezel 405 is constituted by the same material as that of the insulating plate 403 of the first inside front bezel 402. The area of the second inside front bezel 405 is an area that is capable of covering the area corresponding to a line of HDD, for example.

The inside front bezels are constituted by the first inside front bezel 402 and the second inside front bezel 405. At least one thickness of the thickness of the conductive plate 401, the thickness of the insulating plate 403 and the thickness of the second inside front bezel 405 is adjusted so that the surface of the inside front bezels are substantially flush. An outside front bezel 3 is attached to the front sides of the inside front bezels.

Of the first inside front bezel 402 and the second inside front bezel 405, the first inside front bezel 402 is attached by means of welding or the like, for example, to the front face of the enclosure so as to be undetachable by the user. However, the second inside front bezel 405 is attached so as to be detachable by the user. In cases where the user inserts or removes a repair HDD 20(R), for example, the user removes the outside front bezel 3, the second inside front bezel 405 and then inserts or removes the repair HDD 20(R).

<Mechanism for Securing the HDD>

Figure 16A:
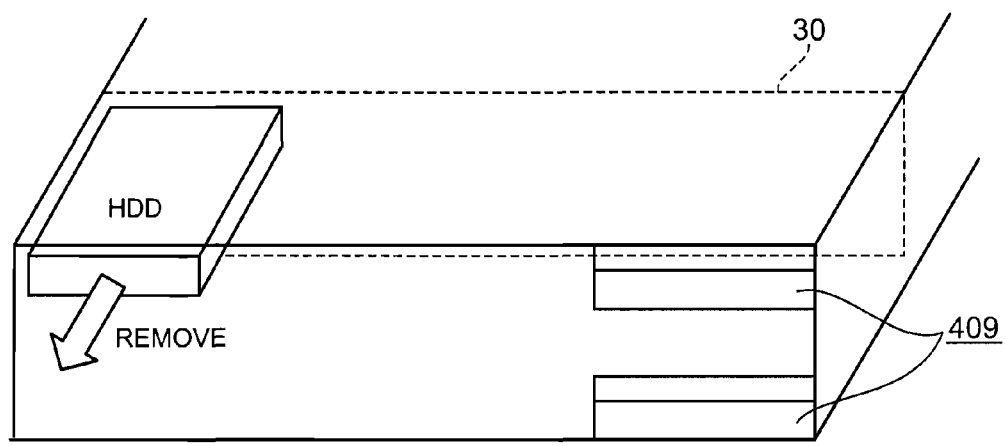
FIG. 16A shows that there is a risk of the HDD moving as a result of the resin or the like of the connector.

As mentioned earlier, the HDD 20 themselves are directly installed in the enclosure 2 without the use of a canister. The possibility of the connected HDD 20 moving in the insertion direction or in the opposite direction during the operation of the storage device 1 after the HDD 20 has been connected to the backboard 30 is considered (See FIG. 16A). The expansion or compression of the HDD 20-side connector and/or backboard 30-side SAS connector due to the effect of heat is considered to be one reason for such movement.

Figure 16B:
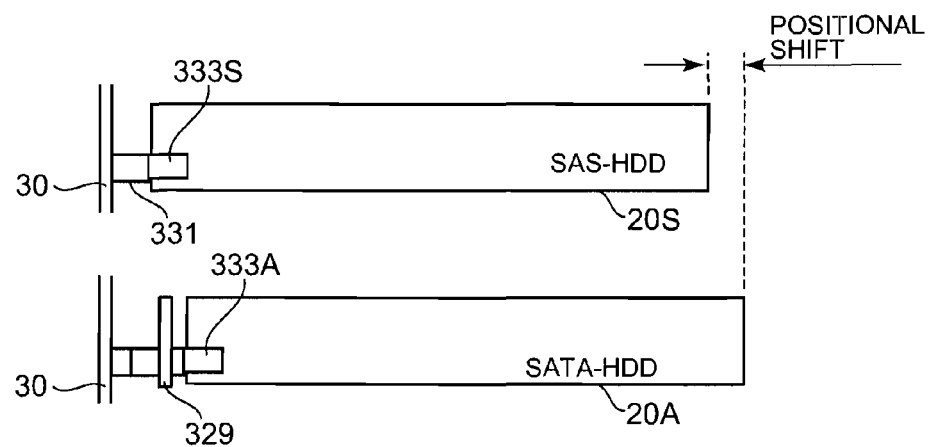
FIG. 16B shows the difference in the HDD front face position between an SAS storage device and SATA storage device.

In addition, in cases where the position of the backboard 30 is the same in the SAS storage device 1 and SATA storage device 1 as shown in FIG. 16B, the position of the front face of the connected HDD 20 differs in SAS storage device 1 and SATA storage device 1. More specifically, the front face of the SATA HDD 20A is located further forward than the front face of the SAS HDD 20S. This is because the dongle board 329 is interposed between the SATA HDD 20A and backboard 30.

In this embodiment, measures for securing the HDD that focus on the above are taken. These measures will be described in detail hereinbelow.

Figure 17:
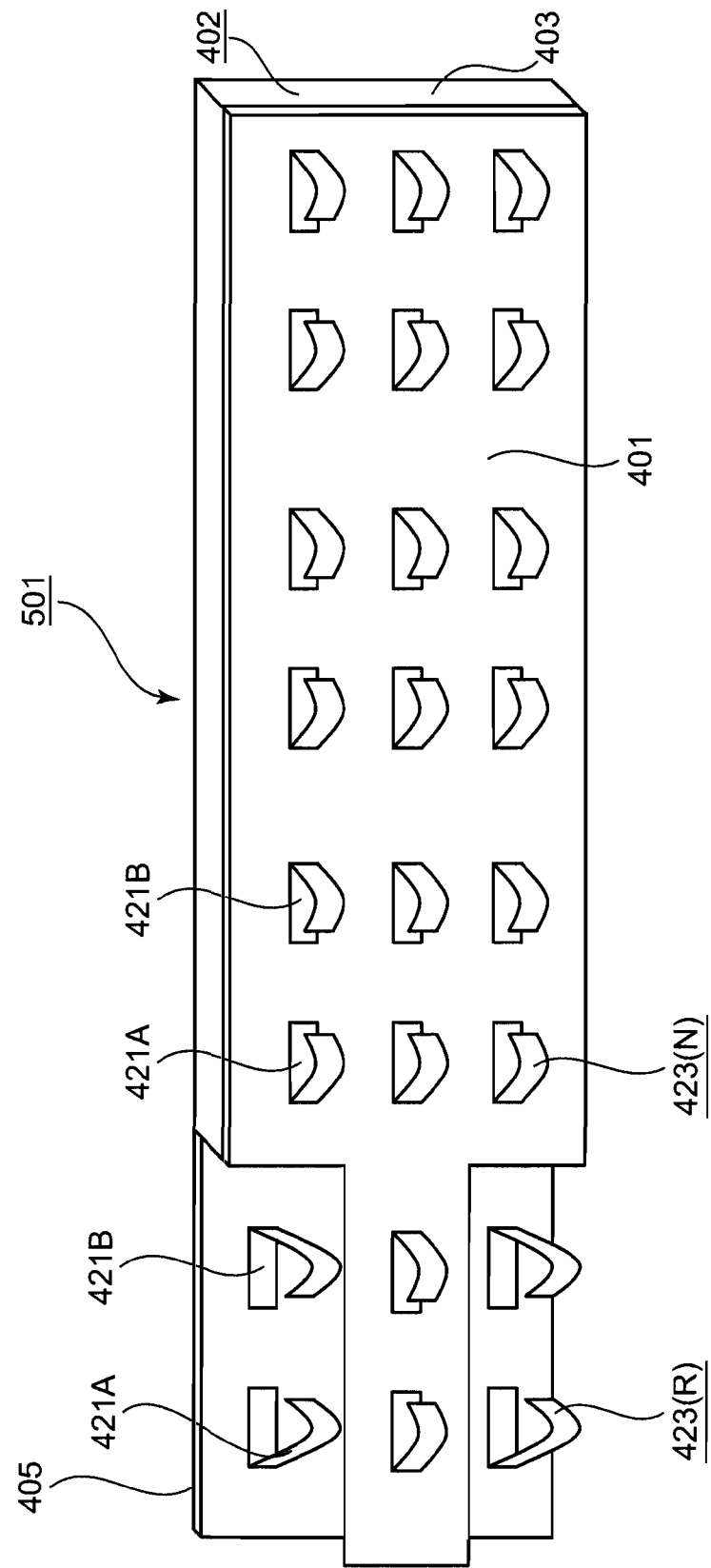
FIG. 17 shows the rear of the inside front bezel.

FIG. 17 shows the back of the inside front bezel.

The back of the inside front bezel 501 is provided with elastic members for pushing the HDD opposite each position facing the respective HDD that can exist in the intra-enclosure front part toward the rear (in the depth direction). The elastic members may be constituted by rubber portions or springs. However, in this embodiment, the elastic members are plate spring portions 423. The plate spring portions 423 are constituted by two plate springs 421A and 421B. The heights of the plate springs 421A and 421B that constitute the plate spring portion 423 (R) on the back of the second inside front bezel 405 (in other words, the plate spring portion 423 (R) that is in a position facing the repair HDD slots 409) are made greater than the heights of the plate springs 421A and 421B that constitute the plate spring portion 423 (N) on the rear side of the first inside front bezel 402 (the back of the conductive plate 401) (in other words, the plate spring portion 423 (N) that is in a position facing the HDD slots in which the HDD 20(N) are inserted). This is because the distance between the back of the second inside front bezel 405 and the front face of the repair HDD 20(R) is greater than the distance between the back of the first inside front bezel 402 and the front face of the HDD 20(N).

The inside front bezel 501 is provided with a plurality of through-bores (not illustrated) for the passage of air from the surface to the back of the inside front bezel 501. Accordingly, air that is taken in via the outside front bezel 3 is able to flow inside the enclosure by passing through the inside front bezel 501.

The inside front bezel 501 is common to both the SAS storage device 1 and SATA storage device 1. Hence, the pushing forces exerted by the respective plate spring portions 423 (includes both the 423(N) and 423R)) that are provided on the back of the inside front bezel 501 is a force such that the difference between the position of the front face of the SAS HDD 20S and the position of the front face of the SATA HDD 20A is absorbed and such that there is no movement toward the front as a result of the resin or the like of the connector by the SAS HDD 20S or the SATA HDD 20A. More specifically, for the respective plate spring portions 423 the positions of the front faces of the SAS HDD 20S and the positions of the front faces of the SATA HDD 20A differ to some extent and the pushing force on the HDD 20 in a state where the inside front bezel 501 is attached to the enclosure front face based on the distance between the back of the first inside front bezel 402 and the HDD 20(N) and the distance between the back of the second inside front bezel 405 and the repair HDD 20(R) in a state where the inside front bezel 501 is attached to the enclosure front face satisfies the following conditions:

(Condition 1) The pushing force on the SAS HDD 20S is greater than the force when the SAS HDD 20S deviates due to resin or the like from the backboard-side SAS connector 331.

(Condition 2) The pushing force on the SATA HDD 20A is greater than both the force when the SATA HDD 20A deviates due to resin or the like from the dongle-side SATA connector 332A and also the force when the dongle board 329 deviates due to resin or the like from the backboard-side SAS connector 331.

Figure 18A:
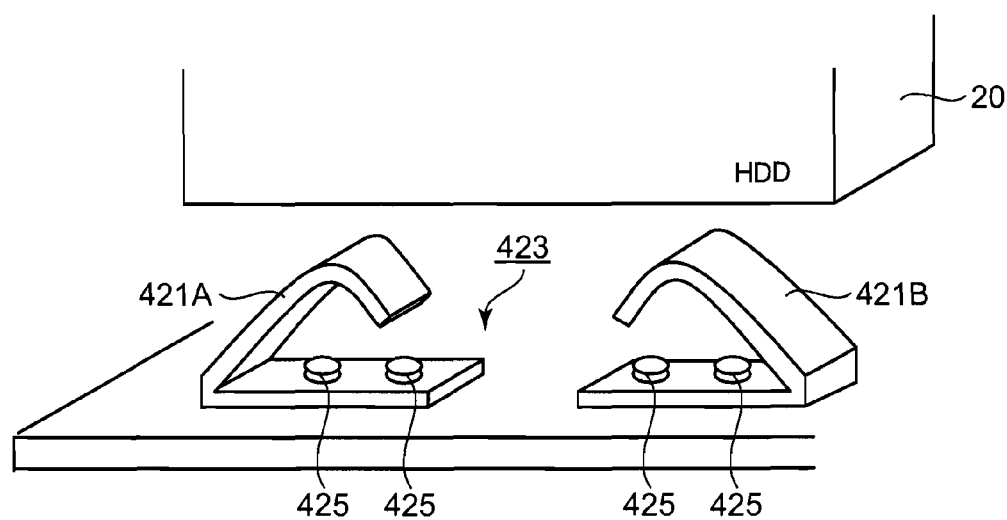
FIG. 18A is a perspective view of an example of a plate spring portion that is provided at the rear of the inside front bezel.

FIG. 18A is a perspective view of a part of the back of the inside front bezel 501 in a horizontal orientation.

The plate springs 421A and 421B are aligned in the width direction of the HDD 20. When the inside front bezel 501 is attached to the front side of the enclosure, the plate springs 421A and 421B shrink (that is, the spring height is low) and, as a result, the plate springs 421A and 421B push the HDD 20(N) toward the rear of the enclosure. The respective plate springs 421A and 421B are secured by means of a member such as a rivet 425 to the back of the inside front bezel 501 (more specifically, to the back of the conductive plate 401 or the back of the second inside front bezel 405). The plate springs 421A and 421B are secured at two or more points. As a result, the rotation of the plate springs 421A and 421B can be prevented.

Figure 18B:
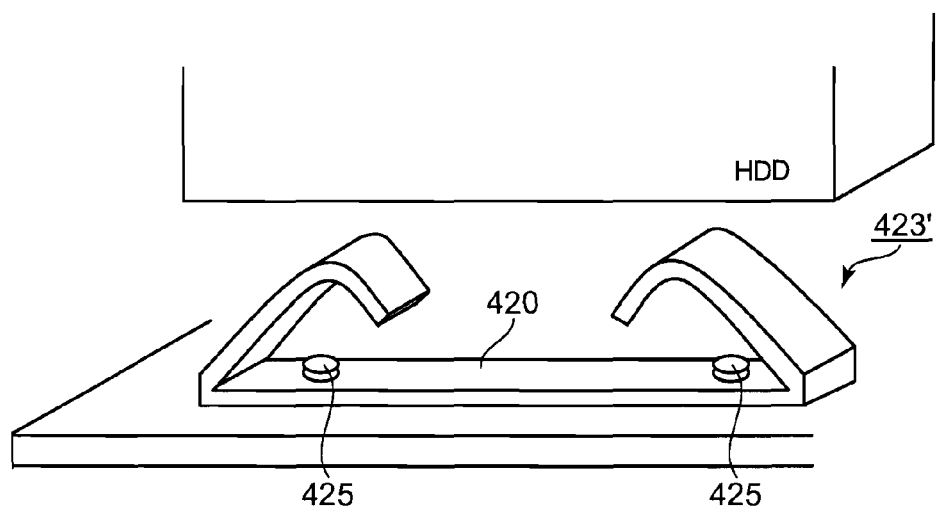
FIG. 18B is a perspective view of a modified example of a plate spring portion that is provided at the rear of the inside front bezel.

FIG. 18B shows a modified example of a plate spring portion.

As shown in FIG. 18B, the plate spring portion 423' may be one plate spring 420 in which the plate springs 421A and 421B are integrated. The plate spring 420 may also be fixed at two or more points by means of members such as rivets 425 in order to prevent rotation. However, the plate spring 420 can be secured by means of a smaller number of members than in cases where there is separation as in the case of the springs 421A and 421B. As a result, the number of parts can be reduced.

<Mechanism for Preventing Breaking of the Seal while the Power ON State Prevails>

Figure 19:
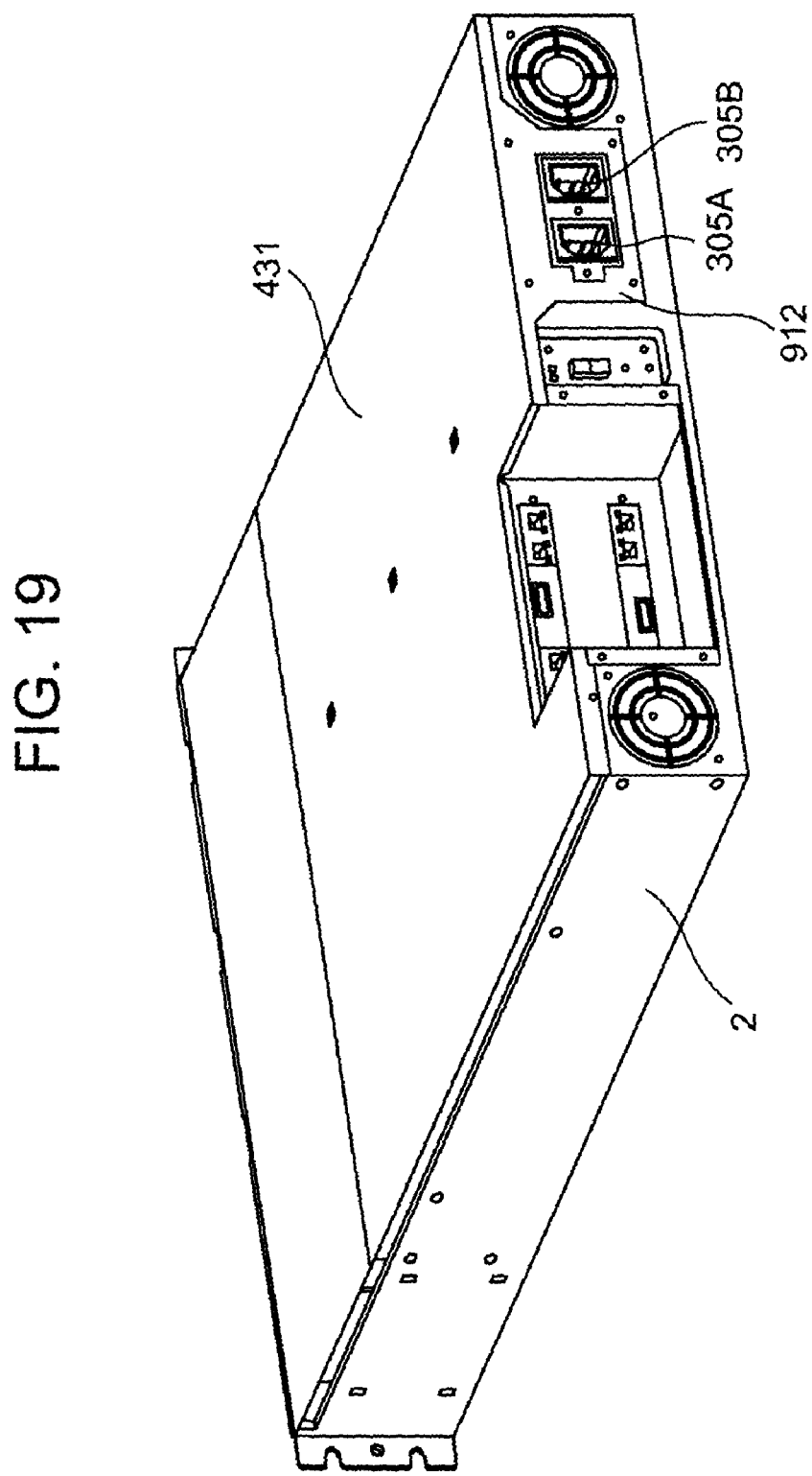
FIG. 19 is a perspective view from the rear of the storage device prior to removal of a second enclosure cover.

As shown in FIG. 19, part of the upper surface of the enclosure 2 is constituted by the second enclosure cover 431. The second enclosure cover 431 is provided so as to be detachable by the user. When the second enclosure cover 431 is removed while the power of the storage device 1 remains ON, there is the risk that the user will be injured due to contact with the active parts or that the storage device 1 will fail.

Therefore, in this embodiment, measures for preventing the breaking of the seal of the second enclosure cover while the power remains ON are taken. Such measures will be described hereinbelow.

Figure 20:
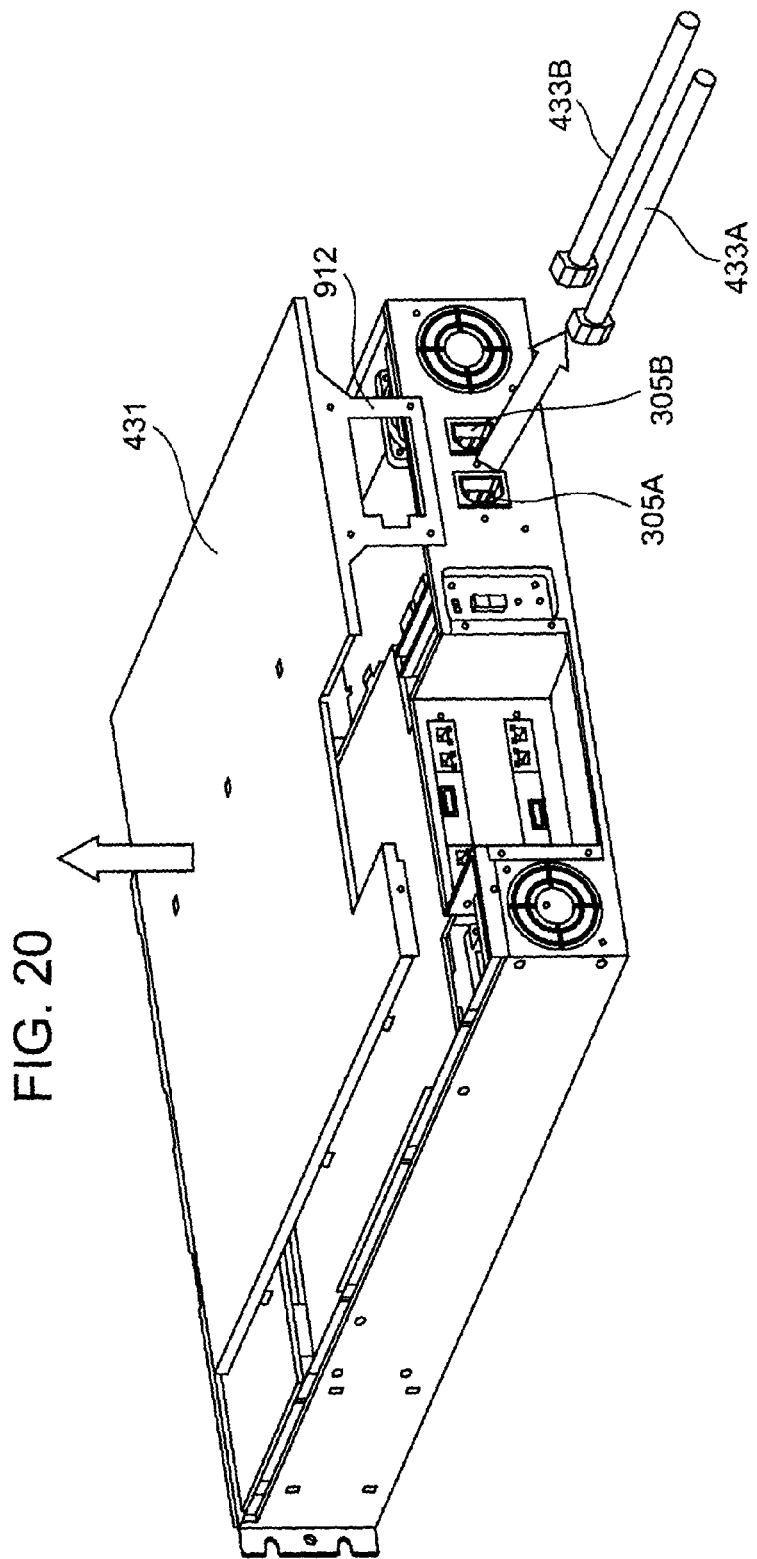
FIG. 20 shows removal of the second enclosure cover after an AC power cable is pulled from the power cable connector at the rear of the enclosure.

As shown in FIG. 19, a frame 912 that surrounds power cable connectors 305A and 305B extends downward along the rear face of the enclosure 2 from a part of the perimeter of the upper surface of the second enclosure cover 431. Because the power cable connectors 305A and 305B are surrounded by the frame 912, the second enclosure cover 431 can be removed after the power cable connectors 305A and 305B are pulled from the AC power cables 433A and 433B as shown in FIG. 20.

The second enclosure cover 431 is normally secured, by means of a fixing member (a detachable member such as a screw, for example), to the rear of the enclosure via the frame 912 or the like, for example, and, consequently, not only is removal of the second enclosure cover 431 limited but also the second enclosure cover 431 cannot be made to slide in the depth direction of the enclosure 2. By removing the fixing member, the second enclosure cover 431 can be made to slide in the depth direction of the enclosure 2 but, when allowed to slide without limits, the leading edge of the second enclosure cover 431 is also raised above the upper surface of the enclosure irrespective of whether the AC power cables 433A and 433B are still connected, as shown in FIG. 21.

Figure 21:
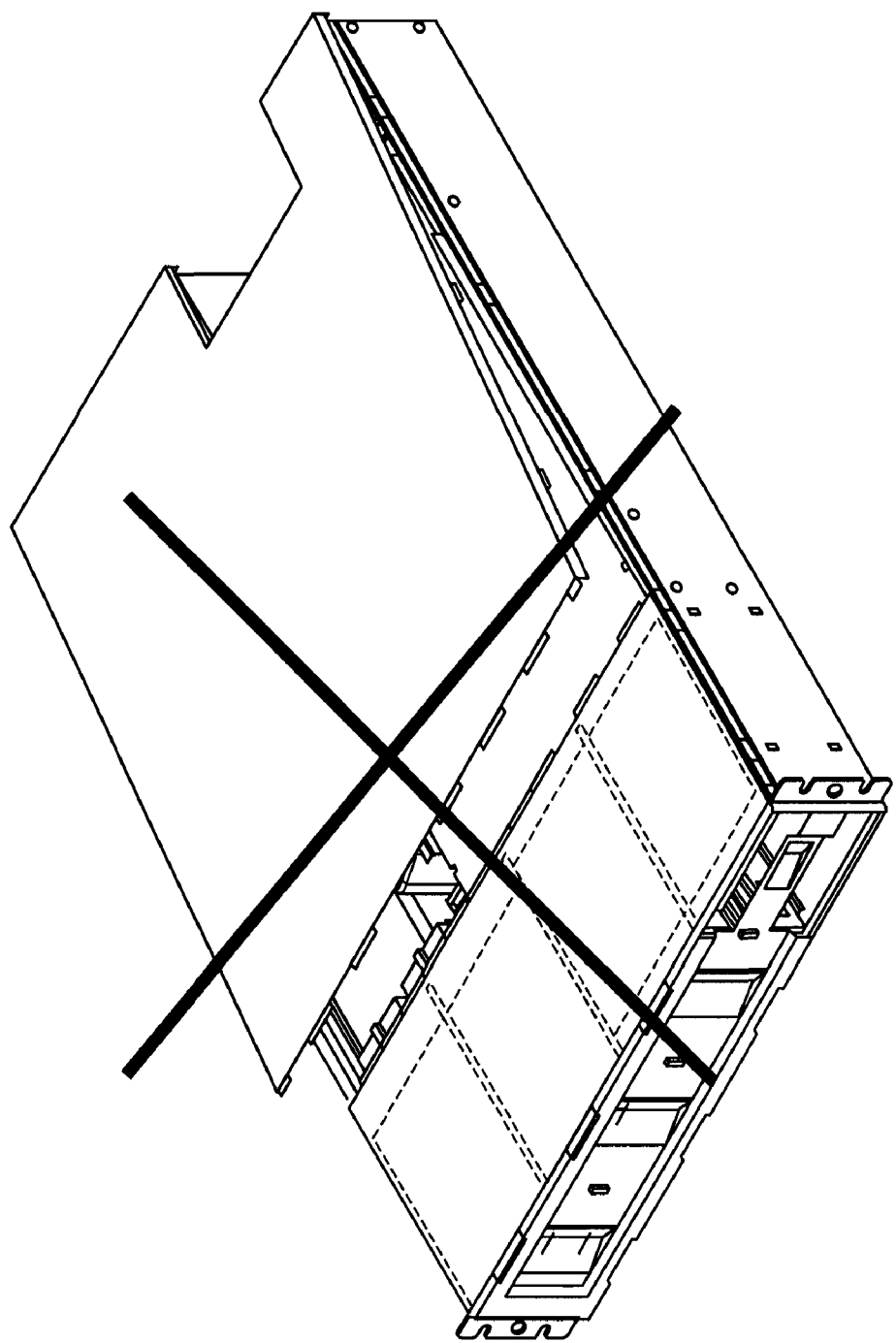
FIG. 21 shows that, when a fixing member is removed in order to fix the second enclosure cover to the enclosure and the second enclosure cover is capable of sliding rearward to any position, the second enclosure cover can be opened even when the AC power cable is still connected to the rear of the enclosure.

In this embodiment, measures for preventing so-called tilted opening as exemplified by FIG. 21 are also implemented.

Figure 22A:
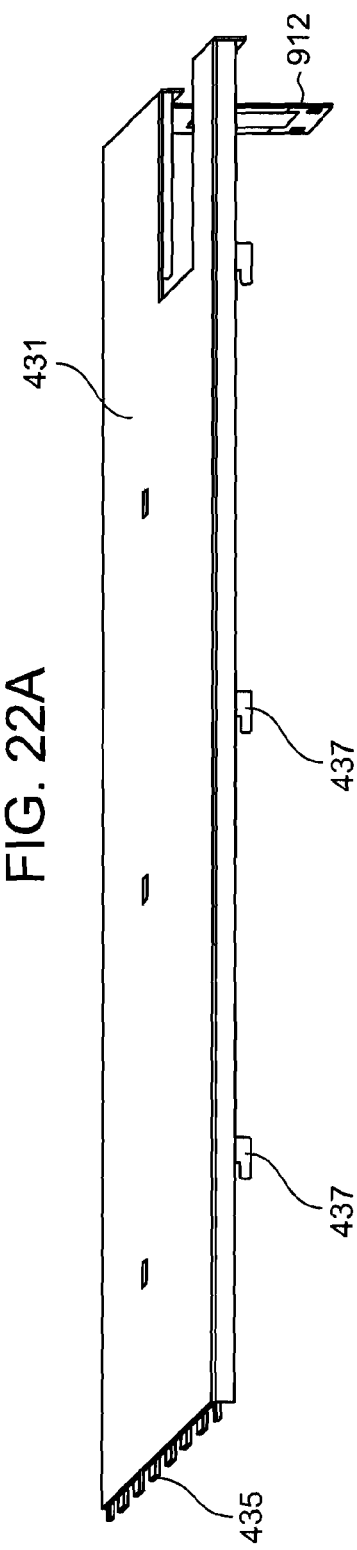
FIG. 22A is a perspective view of the second enclosure cover.
Figure 22B:
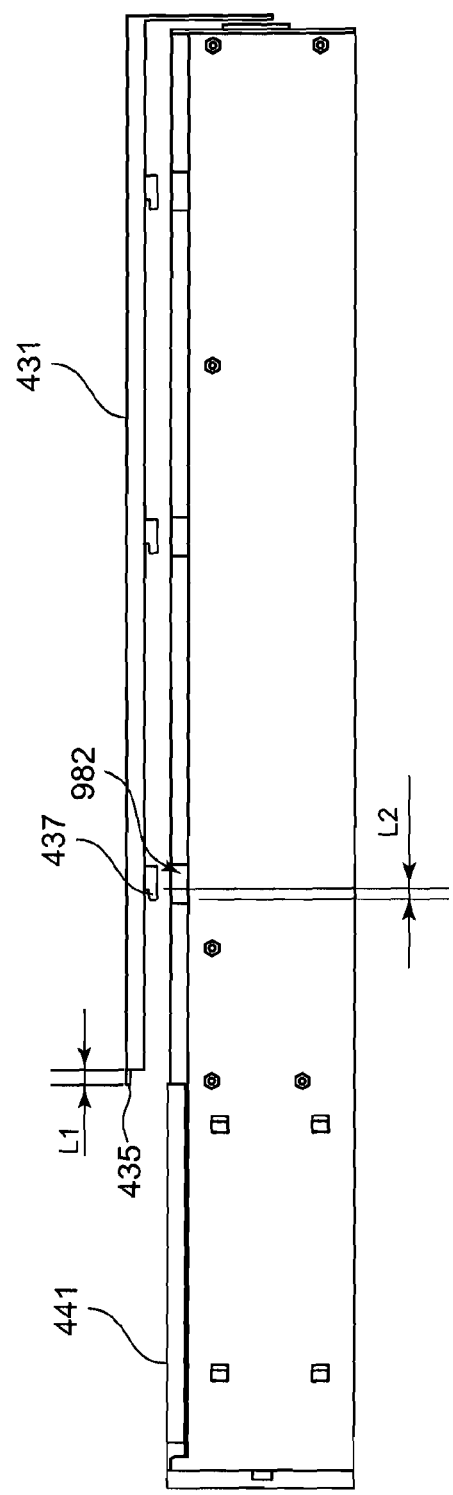
FIG. 22B is a right-side view of the storage device.

As shown in FIGS. 22A and 22B, a first lug 435 that extends forward is provided on the leading edge of the second enclosure cover 431. The first lug 435 hooks onto the back of the first enclosure cover 441 (or a groove may be provided in the thickness of the first enclosure cover 441 so that the first lug 435 may be inserted in the groove).

Figure 31A:
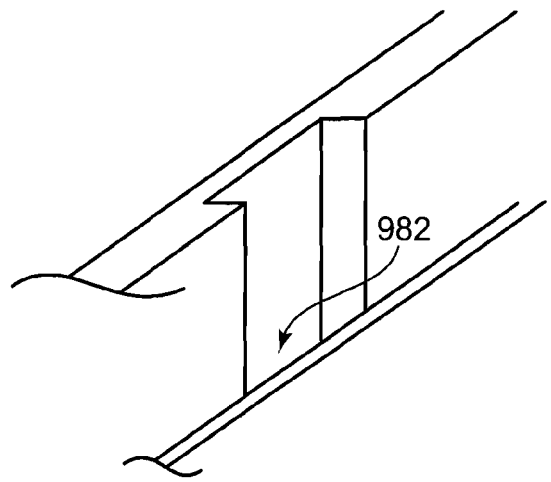
FIG. 31A is a perspective view of a lug hole in which a second lug of the second enclosure cover is inserted.
Figure 31B:
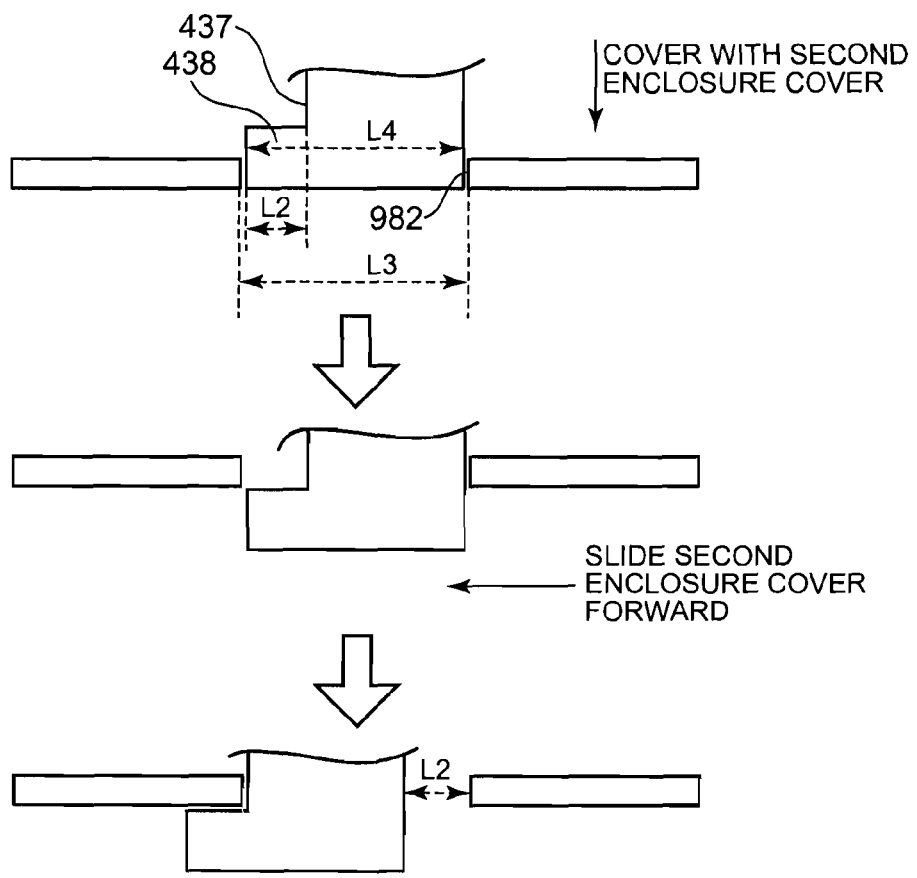
FIG. 31B shows the flow from the time the second enclosure cover is covered until the time the second lug is caught in the lug hole.

In addition, a plurality of second lugs 437 are provided in the vicinity of both edges of the back of the second enclosure cover 431. The second lugs 437 are L-shaped lugs, for example. The second lugs 437 hook into lug holes 982 (See FIG. 31B) as a result of entering lug holes 982 (See FIG. 31A) provided in each of the two walls of the enclosure 2 and the second enclosure cover 431 being made to slide forward when the second enclosure cover 431 is made to cover the enclosure 2. If the second enclosure cover 431 is secured to the enclosure using a fixing member, the second enclosure cover 431 is unable to slide in the anteroposterior direction but, if the fixing member is removed, the second enclosure cover 431 is able to slide by a distance L2 while the second lugs 437 still remain in the lug holes 982. Here, the length L3 of the lug holes 982 is substantially the same as (slightly longer than) the maximum length L4 of the second lugs 437 and the length of the hooked portion 438 of the second lug 437 is L2. Hence, the distance over which sliding is possible is substantially L2.

The length L1 of the first lug 435 may be longer than the distance L2 that the second enclosure cover 431 is made to slide in the anteroposterior direction in a state where the fixing member for fixing the second enclosure cover 431 is removed (that is, the distance L2 over which the second lug 437 is able to move in the anteroposterior direction within the lug hole 982). As a result, the so-called tilted opening as shown in FIG. 21 is prevented.

The second enclosure cover 431 can be removed using the following procedure. In other words, all of the fixing members for fixing the second enclosure cover 431 are first removed. In addition, the AC power cables 433A and 433B are pulled from the power cable connectors 305A and 305B. Thereafter, as shown in FIG. 23A, the hooking of the second lug 437 onto the lug holes 982 is removed by sliding the second enclosure cover 431 rearward as far as possible. As shown in FIG. 23B, the hooking of the first lug 435 onto the first enclosure cover 441 is removed by raising the rear part of the second enclosure cover 431 and the second enclosure cover 431 is removed by pulling the second enclosure cover 431 rearward.

<Control of the Speed of the Cooling Fan>

As mentioned earlier, the main controllers 10A and 10B are capable of controlling the speeds of the cooling fans 71A and 71B via the switch subcontroller 321.

Figure 24:
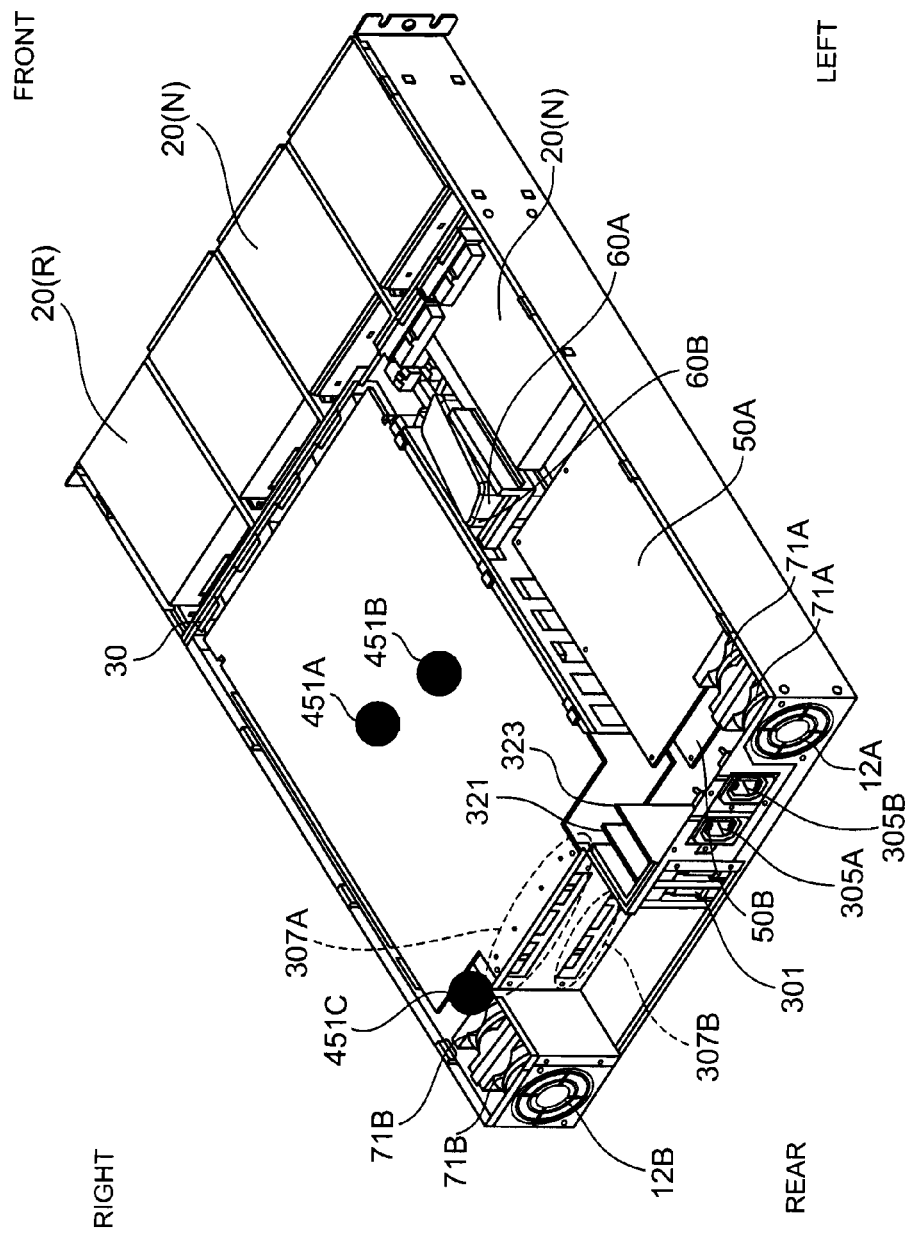
FIG. 24 shows the disposition of temperature sensors in the enclosure.

More specifically, for example, as shown in FIG. 24, temperature sensors 451A, 451B, and 451C are provided. The temperature sensors 451A and 451B are provided in the processor sections 130A and 130B of the main controllers 10A and 10B (in CPU 131A and 131B). Temperature sensor 451C is provided in the vicinity of the through hole 12B (in the vicinity of the cooling fan 71B between the main controllers 10A and 10B and the cooling fans 71B, for example). In order to clearly express the fact that the temperature sensors 451A, 451B, and 451C are provided, FIG. 24 represents the temperature sensors 451A, 451B, and 451C by means of circles in a size that stands out but there is no need for the sizes of the temperature sensors 451A, 451B, and 451C to be as large as indicated by these circles. The circles may be sufficiently smaller than this size, for example (the same also goes for FIG. 28).

A first fan control table 453A that is exemplified by FIG. 25A and a second fan control table 453B that is exemplified by FIG. 25B are stored in the memories 133A and 133B (or other storage resources) in the processor sections 130A and 130B of the main controllers 10A and 10B. The first fan control table 453A is a table that corresponds with temperature sensor 451C and the second fan control table 453B is a table that corresponds with the temperature sensors 451A and 451B. The respective tables 453A and 453B each record the correspondence between the detected temperature range and speed.

The CPU 131A and 131B of the main controllers 10A and 10B are able to carry out the cooling fan control processing shown in FIG. 26 by executing a cooling fan control program.

In other words, in a normal state (S431: YES), the cooling fan control program controls the speed of the cooling fans 71A and 71B on the basis of the temperature detected in each case by the temperature sensors 451A, 451B, and 451C and the fan control tables 453A and 453B (S432). More specifically, for example, the cooling fan control program specifies a first speed that corresponds with the temperature detected by the temperature sensor 451C from the fan control table 453A, specifies a second speed that corresponds with the temperature detected by the temperature sensors 451A and 451B from the fan control table 453B and controls the cooling fans 71A and 71B so that same rotate at the higher of the two speeds which are the first speed and the second speed. A 'normal state' refers to a state where none of the power devices 50A and 50B, the CPU 131A and 131B, and the cooling fans 71A and 71B has failed.

However, if a normal state does not exist (S431: NO), in other words, if a fault is detected in at least any of the power devices 50A and 50B, CPU 131A and 131B and the cooling fans 71A and 71B, the fan control program exercises control so that the speed of the cooling fans 71A and 71B is the maximum speed.

As a modified example of the fan control, a third fan control table 455 that is exemplified in FIG. 27 is stored in memories 133A and 133B and the third fan control table 455 may be used as the basis of the fan control processing. The third fan control table 455 records the speed corresponding with each fault site. If the fan control program detects a fault in the device (if S431 in FIG. 26 yields a NO), the fan control program may specify a speed that corresponds with the device from the third control table 455 in place of S433 and may control the cooling fans 71A and 71B so that same rotate at the specified speed.

Figure 28:
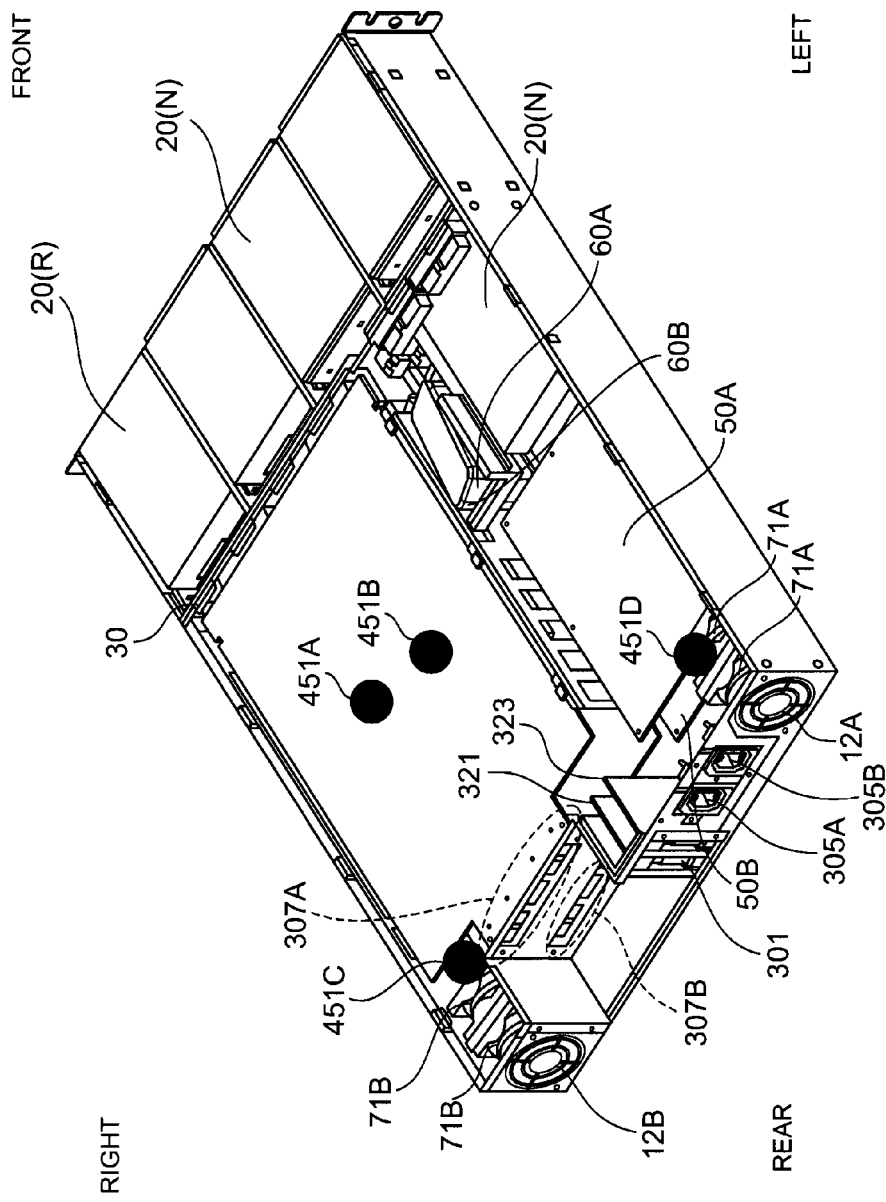
FIG. 28 shows a modified example of the disposition of the temperature sensors in the enclosure.

As another modified example for the fan control, a temperature sensor 451D may be provided in the vicinity of the other through-hole 17A in addition to the temperature sensors 451A to 451C, as shown in FIG. 28. The fan control processing may be based on the temperature detected by the temperature sensor 451D.

A few embodiments and modified examples of the present invention were described hereinabove but these embodiments and modified examples are only examples for the purpose of describing the present invention, there being no intention to limit the scope of the present invention to these embodiments and modified examples. The present invention can also be implemented in a variety of other forms without departing from the spirit of the invention.

What is claimed is:

1. A storage device, comprising:
an enclosure having an interior space;
a plurality of drive connectors provided within the enclosure and to which media drives are connected, the plurality of drive connectors including pre-installed connectors, a first expansion drive connector and a second expansion drive connector, the media drives including at least one pre-installed media drive connected to a respective pre-installed connector of the pre-install connectors, the plurality of drive connectors being arranged in a matrix configuration having a plurality of rows and a plurality of columns;
an expansion slot member having a smaller number of expansion drive slots than a number of the at least one pre-installed media drive, a first expansion media drive of the media drives that is inserted via the a first expansion drive slot of the expansion slot member is connected to the first expansion connector, the first expansion media drive installed so as to be detachable by a user, the first expansion drive connector is located in a same column of the plurality of columns of the matrix configuration as the second expansion drive connector;
a cooling fan provided in the enclosure;
a backboard which is a circuit substrate having at least one of the plurality of drive connectors on a front face of the backboard and which the backboard is disposed so as to divide the interior space of the enclosure in an anteroposterior direction; and
a plurality of temperature-dependent devices disposed behind the backboard, wherein air is taken in via an enclosure front face from outside the enclosure as a result of rotation of the cooling fan, flows through the interior space of the enclosure, and then passes through the backboard.

2. The storage device according to claim 1, wherein the first expansion connector and the second expansion drive connector are located in a right-most column of the plurality of columns of the matrix configuration.

3. The storage device according to claim 1, wherein the first expansion connector and the second expansion drive connector are located in a left-most column of the plurality of columns of the matrix configuration.

4. The storage device according to claim 1, wherein the plurality of columns includes a first column in front of a power device of the plurality of temperature-dependent devices and a second column in front of a battery of the plurality of temperature-dependent devices, the first column has a higher priority than the second column when connecting at least one of the media drives to at least one of the plurality of drive connectors, such that one of the media drives is connected in a row of the plurality of rows of the first column before connecting another one of the media drives to the row of the second column.

5. The storage device according to claim 4, wherein the plurality of rows of the matrix configuration includes three rows and a middle row of the three rows has a higher priority when connecting the at least one of the media drives to the at least one of the plurality of drive connectors, such that the entire middle row of connectors have connected media drives before connecting another media drive of the media drives in a row other than the middle row of the three rows.

6. The storage device according to claim 5, wherein the plurality of columns of the matrix configuration includes a third column and a fourth column in front of a controller of the temperature-dependent devices, the third and fourth columns having priority over the first and second columns, such that when connecting the at least one of the media drives to the at least one of the plurality of drive connectors, the entire third column and fourth column of the plurality of connectors have the connected media drives before connecting another media drive in the first or second column.

7. The storage device according to claim 5, wherein a bottom row of the three rows has a higher priority than a top row of the three rows, when connecting the at least one of the media drives to the at least one of the plurality of drive connectors after the entire middle row of connectors have the connected media drives.

8. The storage device according to claim 1, wherein the at least one pre-installed media drive comprises two or more undetachably connected media drives that are connected to two or more of the pre-installed connectors respectively.

9. The storage device according to claim 8, wherein the two or more undetachably connected pre-installed media drives are located on a rear face of the backboard.

* * * * *